United States Patent
Hirosue et al.

(10) Patent No.: US 10,836,215 B2
(45) Date of Patent: Nov. 17, 2020

(54) TIRE

(71) Applicant: Sumitomo Rubber Industries, Ltd., Hyogo (JP)

(72) Inventors: Eisuke Hirosue, Kobe (JP); Hiroshi Kikuchi, Kobe (JP); Tomohisa Kuriyama, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 266 days.

(21) Appl. No.: 16/002,577

(22) Filed: Jun. 7, 2018

(65) Prior Publication Data

US 2018/0370290 A1 Dec. 27, 2018

(30) Foreign Application Priority Data

Jun. 27, 2017 (JP) .................................. 2017-125446
Apr. 10, 2018 (JP) .................................. 2018-075601
Apr. 10, 2018 (JP) .................................. 2018-075602

(51) Int. Cl.
*B60C 11/03* (2006.01)
*B60C 11/13* (2006.01)
*B60C 11/12* (2006.01)

(52) U.S. Cl.
CPC ...... *B60C 11/0304* (2013.01); *B60C 11/0306* (2013.01); *B60C 11/1236* (2013.01);
(Continued)

(58) Field of Classification Search
CPC . B60C 11/03; B60C 11/0304; B60C 11/0306; B60C 11/12; B60C 11/1236;
(Continued)

(56) References Cited

U.S. PATENT DOCUMENTS

2010/0116393 A1* 5/2010 Miyazaki ............ B60C 11/1263
152/209.18
2014/0238566 A1 8/2014 Takahashi
(Continued)

FOREIGN PATENT DOCUMENTS

EP 1 566 291 A1 8/2005
EP 2 610 086 A1 7/2013
(Continued)

OTHER PUBLICATIONS

Kuwayama Isao, WO-2015170478-A1, machine translation. (Year: 2015).*
(Continued)

*Primary Examiner* — Robert C Dye
*Assistant Examiner* — Sedef E Paquette
(74) *Attorney, Agent, or Firm* — Studebaker & Brackett PC

(57) ABSTRACT

A tire includes a tread portion including at least one land portion having axially spaced first and second ends. The at least one land portion is provided with lateral grooves extending from the first end to terminal ends terminating within the at least one land portion, first sipes each extending along a tire circumferential direction to connect a pair of lateral grooves arranged adjacently in the tire circumferential direction, second sipes extending from the first end toward the first sipes, and third sipes extending from the second end toward the first sipes. The second sipes and the third sipes are arranged without intersecting the lateral grooves.

18 Claims, 15 Drawing Sheets

(52) U.S. Cl.
CPC ...... *B60C 11/1263* (2013.01); *B60C 11/1307* (2013.01); *B60C 11/1369* (2013.01); *B60C 11/1392* (2013.01); *B60C 2011/0365* (2013.01); *B60C 2011/0367* (2013.01); *B60C 2011/0369* (2013.01); *B60C 2011/1209* (2013.01); *B60C 2011/1245* (2013.01); *B60C 2011/133* (2013.01)

(58) Field of Classification Search
CPC ............... B60C 11/124; B60C 11/1263; B60C 11/1307; B60C 11/1369; B60C 11/1384; B60C 11/1392; B60C 2011/0348; B60C 2011/0365; B60C 2011/0367; B60C 2011/0369; B60C 2011/1209; B60C 2011/1245; B60C 2011/133
USPC ...................................................... 152/209.8
See application file for complete search history.

(56) References Cited

U.S. PATENT DOCUMENTS

| | | | | |
|---|---|---|---|---|
| 2016/0039248 | A1* | 2/2016 | Sueno | B60C 11/12 152/209.8 |
| 2016/0082780 | A1* | 3/2016 | Nagahara | B60C 11/1236 152/209.18 |
| 2016/0152087 | A1* | 6/2016 | Hayashi | B60C 11/0309 152/209.18 |
| 2017/0050471 | A1 | 2/2017 | Shimura | |

FOREIGN PATENT DOCUMENTS

| | | |
|---|---|---|
| EP | 3 260 307 A1 | 12/2017 |
| JP | 2012-201335 A | 10/2012 |
| JP | 2014-205459 A | 10/2014 |
| JP | 2015-47977 A | 3/2015 |
| JP | 2017-88174 A | 5/2017 |
| WO | 2015/70478 A1 | 11/2015 |

OTHER PUBLICATIONS

The extended European search report issued by the European Patent Office dated Oct. 16, 2018, which corresponds to European Patent Application No. 18177513.1-1012 and is related to U.S. Appl. No. 16/002,577.

* cited by examiner

TIRE

BACKGROUND ART

Field of the Disclosure

The present disclosure relates to tires, and more particularly to a tire which may be embodied as all-season tire suitably.

Description of the Related Art

Generally, all-season tires are required to exhibit not only driving performance on dry roads but also superior snow road performance. In order to improve driving performance of tires on slippery snow road conditions, generating powerful snow-shearing force and road scratching effect are important. Upon traveling on snow, lateral grooves of tires generate snow-shearing force by compressing snow therein to form snow columns, and then by shearing them. Thus, to improve snow road performance, tire treads provided with a high density and lengthy lateral grooves may be effective. Further, edges of lateral grooves and/or sipes (i.e. ridgelines formed between the tread ground contact surface and lateral groove walls or sipe walls) can increase traction by scratching compressed snow roads. The following Patent Literature 1 discloses related art techniques.

[Patent Literature 1]
Japanese Unexamined Patent Application Publication 2012-201335

Unfortunately, while lateral grooves and/or sipes which traverse a tread land portion completely can be useful to improve snow road performance, they reduce in tread pattern rigidity, resulting in a deterioration of steering stability on dry road conditions.

SUMMARY OF THE DISCLOSURE

In view of the above problems in the conventional art, the present disclosure has an object to provide tires capable of improving snow road performance and steering stability on dry roads in a well-balanced manner.

According to one aspect of the present disclosure, a tire includes a tread portion comprising at least one land portion having axially spaced first and second ends. The at least one land portion is provided with lateral grooves extending from the first end to terminal ends terminating within the at least one land portion, first sipes each extending along a tire circumferential direction to connect a pair of lateral grooves arranged adjacently in the tire circumferential direction, second sipes extending from the first end toward the first sipes, and third sipes extending from the second end toward the first sipes. The second sipes and the third sipes are arranged without intersecting the lateral grooves.

In another aspect of the present disclosure, the second sipes, the third sipes and the lateral grooves may be inclined in a same direction as each other with respect to a tire axial direction.

In another aspect of the present disclosure, the second sipes and the third sipes may be substantially in communication with the first sipes.

In another aspect of the present disclosure, at least one end of each of the first sipes may be in communication with one of the lateral grooves.

In another aspect of the present disclosure, two or more second sipes may be arranged between a pair of lateral grooves arranged adjacently in the tire circumferential direction.

In another aspect of the present disclosure, two or more third sipes may be provided between a pair of lateral grooves arranged adjacently in the tire circumferential direction.

In another aspect of the present disclosure, the at least one land portion may further be provided with fourth sipes extending from the terminal ends of the lateral grooves to the second end.

In another aspect of the present disclosure, the at least one land portion may comprise two middle land portions between which a tire equator is disposed, the respective middle land portions may comprise the second sipes communicated with the first sipes and the third sipes communicated with the first sipes, and the second sipes and the third sipes may be communicated with the first sipes at same locations in the tire circumferential direction.

In another aspect of the present disclosure, the tread portion may have a predetermined orientation for mounting on a vehicle to define an outboard tread edge to be located outwardly of the vehicle and an inboard tread edge to be located inwardly of the vehicle upon being mounted on the vehicle, and the first end may correspond to an axial end on the inboard tread edge side of the respective middle land portions.

In another aspect of the present disclosure, the middle land portions may comprise an inboard middle land portion disposed between the inboard tread edge and the tire equator, and an outboard middle land portion disposed between the outboard tread edge and the tire equator, and an axial width of the outboard middle land portion may be greater than an axial width of the inboard middle land portion.

In another aspect of the present disclosure, the axial width of the outboard middle land portion may be in a range of from 1.05 to 1.10 times the axial width of the inboard middle land portion.

In another aspect of the present disclosure, axial lengths of the lateral grooves provided on the outboard middle land portion may be greater than axial lengths of the lateral grooves provided on the inboard middle land portion.

In another aspect of the present disclosure, a ratio of the axial lengths of the lateral grooves provided on the outboard middle land portion to the axial width of the outboard middle land portion may be in a range of from 0.95 to 1.05 times a ratio of the axial lengths of the lateral grooves provided on the inboard middle land portion to the axial width of the inboard middle land portion.

In another aspect of the present disclosure, the tread portion may further be provided with a circumferentially extending outboard shoulder main groove arranged between the tire equator and the outboard tread edge to define an outboard shoulder land portion disposed between the outboard shoulder main groove and the outboard tread edge, the outboard shoulder land portion may be provided with at least one outboard shoulder sipe extending from the outboard tread edge to the outboard shoulder main groove, and the at least one outboard shoulder sipe may comprise a middle shallow-bottom portion where a sipe bottom raises locally between the outboard shoulder main groove and the outboard tread edge.

In another aspect of the present disclosure, the at least one land portion may comprise a ground contact surface between the first end and the second end, and a pair of land sidewalls. The at least one land portion may comprise the second sipes communicated with the first sipes, the third sipes communicated with the first sipes, and at least one chamfered portion provided on a corner between the ground contact surface and one of the pair of land sidewalls. The second sipes and the third sipes may be communicated with the first sipes at same locations in the tire circumferential direction, and the at least one chamfered portion may comprise at least one first chamfered portion provided on the first end side so as to connect one lateral groove and one second sipe which are adjacently arranged.

In another aspect of the present disclosure, the at least one first chamfered portion may have a depth greater than a depth of the first sipe to which the at least one first chamfered portion is connected.

In another aspect of the present disclosure, the at least one first chamfered portion may have a depth greater than a depth of the one lateral groove to which the at least one first chamfered portion is connected.

In another aspect of the present disclosure, an angle, in a plan view of the tread portion, between the one lateral groove and the at least one first chamfered portion may be an obtuse angle.

In another aspect of the present disclosure, at least two third sipes may be provided between a pair of lateral grooves arranged adjacently in the tire circumferential direction, and the at least one chamfered portion may comprise at least one second chamfered portion provided on the second end side so as to connect two third sipes which are adjacent arranged.

In another aspect of the present disclosure, a region in which the at least one second chamfered portion is axially projected on the first end may overlap the at least one first chamfered portion at least partially.

DESCRIPTION OF THE PREFERRED EMBODIMENTS

An embodiment of the present disclosure will be explained below with reference to the accompanying drawings.

Figure 1:
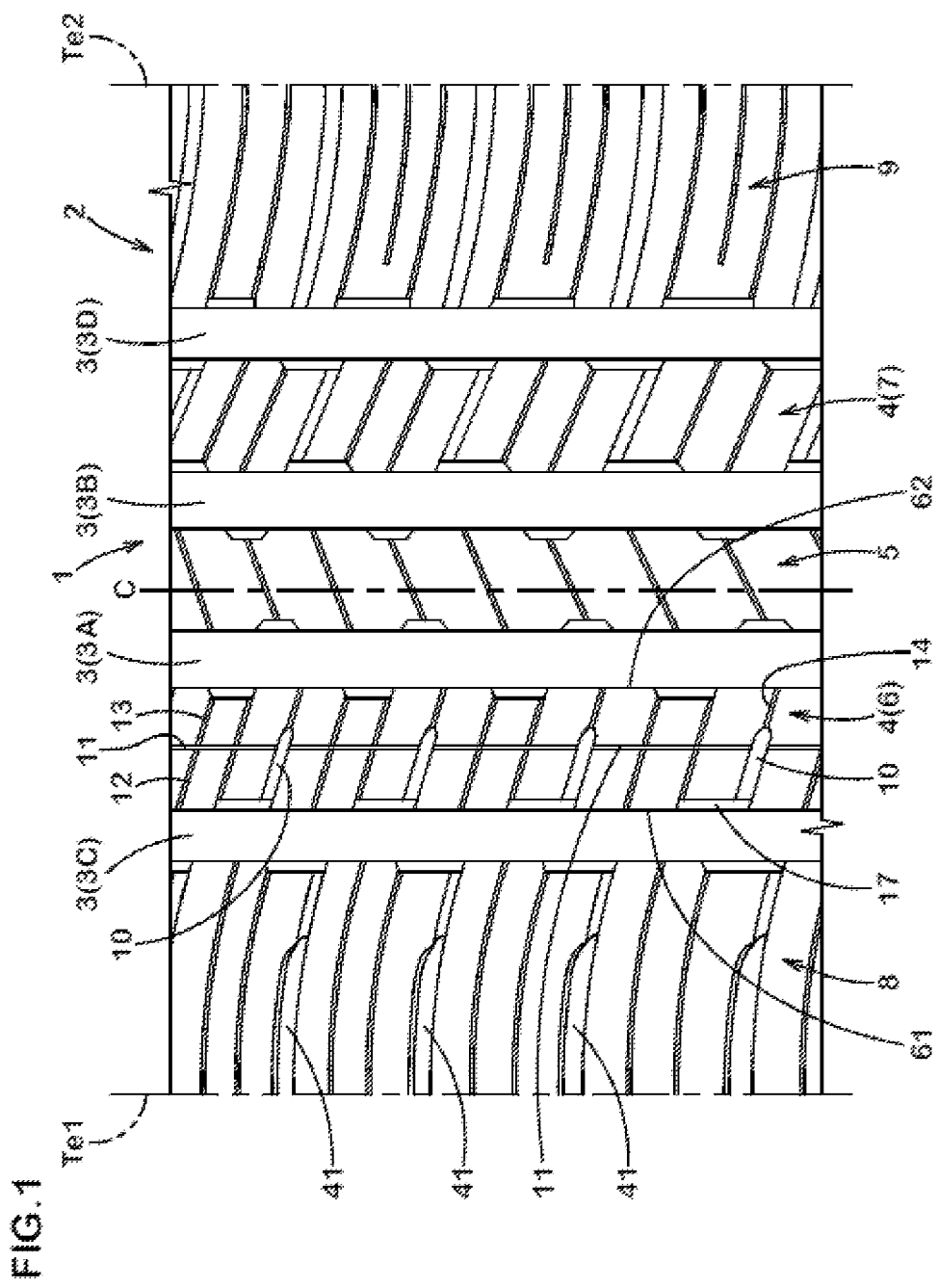
FIG. 1 is a development view of a tread portion of a tire in accordance with an embodiment of the present disclosure.

FIG. 1 illustrates a development view of a tread portion 2 of a tire 1 in accordance with an embodiment of the present disclosure.

The tire 1 in accordance with the present embodiment, for example, is configured as a pneumatic tire for automobile, for example. The tire 1 in accordance with the present embodiment, for example, is suitably embodied as an all-season tire for passenger car and/or SUV.

As illustrated in FIG. 1, the tire includes the tread portion 2. The tread portion 2 includes a tread pattern portion that comes into contact with the ground. In this embodiment, the tire 1 has a left-right asymmetric tread pattern.

In order for the tread pattern to be able to exert its intended feature maximumly, the tire according to the embodiment has a predetermined orientation for mounting on a vehicle. The predetermined orientation for mounting on the vehicle, for example, may be indicated on a sidewall portion (not illustrated) using letters or marks.

The tread portion 2 includes an inboard tread edge Te1 to be located inwardly of the vehicle upon being mounted on the vehicle, an outboard tread edge Te2 to be located outwardly of the vehicle upon being mounted on the vehicle, a plurality of main grooves 3, and at least one land portion (plural in the embodiment) divided by the plurality of main grooves.

As used herein, in the case of a pneumatic tire, the inboard and outboard tread edges Te1 and Te2 refer to axially outermost edges of the ground contacting patch of the tread portion 2 which occurs under a standard loaded condition when the camber angle of the tire is zero.

As used herein, the standard loaded condition of the tire 1 is such that the tire 1 is mounted onto a standard wheel rim and inflated to a standard pressure and loaded with a standard tire load.

As used herein, a standard condition of the tire 1 is such that the tire 1 is mounted onto the standard wheel rim and inflated to the standard pressure but loaded with no tire load. In this application including specification and claims, various dimensions, positions and the like of the tire 1 refer to those under the standard condition of the tire unless otherwise noted.

As used herein, the standard wheel rim is a wheel rim officially approved or recommended for the tire by standards organizations, wherein the standard wheel rim is the "standard rim" specified in JATMA, the "Measuring Rim" in ETRTO, and the "Design Rim" in TRA or the like, for example.

As used herein, the standard pressure is a standard pressure officially approved or recommended for the tire by standards organizations, wherein the standard pressure is the "maximum air pressure" in JATMA, the "Inflation Pressure" in ETRTO, and the maximum pressure given in the "Tire Load Limits at Various Cold Inflation Pressures" table in TRA or the like, for example.

As used herein, the standard tire load is a tire load officially approved or recommended for the tire by standards organizations, wherein the standard load is the "maximum load capacity" in JATMA, the "Load Capacity" in ETRTO, and the maximum value given in the above-mentioned table in TRA or the like.

The main grooves 3 extend continuously in the tire circumferential direction and have relatively wider widths and deeper depths for draining water on the ground toward backwardly of the tire. In some preferred embodiments, the main grooves 3 have the widths and depths equal to or more than 5 mm, more preferably equal to or more than 6 mm. Alternatively, the widths of the main grooves 3 may be in a range of from 3.0% to 5.0% of the tread width. As used herein, the tread width is an axial distance from the inboard tread edge Te1 to the outboard tread edge Te2 under the standard condition of the tire 1. The respective main grooves 3, for example, extend straightly in parallel with the tire circumferential direction. Alternatively, one or more main grooves 3 may extend in a non-straight manner, e.g., zigzag or wavy manner.

In this embodiment, the tread portion 2 is provided with four main grooves 3. The main grooves 3 include an inboard crown main groove 3A and an outboard crown main groove 3B which are arranged such that the tire equator C is located therebetween. Further, the main grooves 3 include an inboard shoulder main groove 3C arranged between the inboard crown main groove 3A and the inboard tread edge Te1, and an outboard shoulder main groove 3D arranged between the outboard crown main groove 3B and the outboard tread edge Te2.

An axial distance from the tire equator C to the groove centerline of the inboard crown main groove 3A, and an axial distance from the tire equator C to the groove centerline of the outboard crown main groove 3B are preferably in a range of from 5% to 15% of the tread width. An axial distance from the tire equator C to the groove centerline of the inboard shoulder main groove 3C, and an axial distance from the tire equator C to the groove centerline of the outboard shoulder main groove 3D are preferably in a range of from 20% to 30% of the tread width.

By the main grooves 3, the tread portion 2 is divided to include two middle land portions 4 between which the tire equator C is sandwiched. In the tread portion 2 according to the embodiment, the two middle land portions 4 include an inboard middle land portion 6 disposed between the inboard tread edge Te1 and the tire equator C, and an outboard middle land portion 7 disposed between the outboard tread edge Te2 and the tire equator C. The tread portion 2 according to the embodiment, in addition to these middle land portions, includes a crown land portion 5, an inboard shoulder land portion 8, and an outboard shoulder land portion 9, i.e. being divided into five land portions in total. Note that the tire 1 according to the disclosure is not limited to the above aspect but the tread portion 2 can be divided by three main grooves 3 into four land portions in total, i.e., two middle land portions and two shoulder land portions.

The crown land portion 5 is defined between the inboard crown main groove 3A and the outboard crown main groove 3B. The inboard middle land portion 6 is defined between the inboard crown main groove 3A and the inboard shoulder main groove 3C. The outboard middle land portion 7 is defined between the outboard crown main groove 3B and the outboard shoulder main groove 3D. The inboard shoulder land portion 8 is defined between the inboard shoulder main groove 3C and the inboard tread edge Te1. The outboard shoulder land portion 9 is defined between the outboard shoulder main groove 3D and the outboard tread edge Te2.

The inboard middle land portion 6 includes a first end 61 and a second end 62 which are axially spaced. The first end 61 corresponds to an axial end on the inboard tread edge Te1 side of the inboard middle land portion 6. The second end 62 corresponds to an axial end on the outboard tread edge Te2 side of the inboard middle land portion 6.

Figure 2:
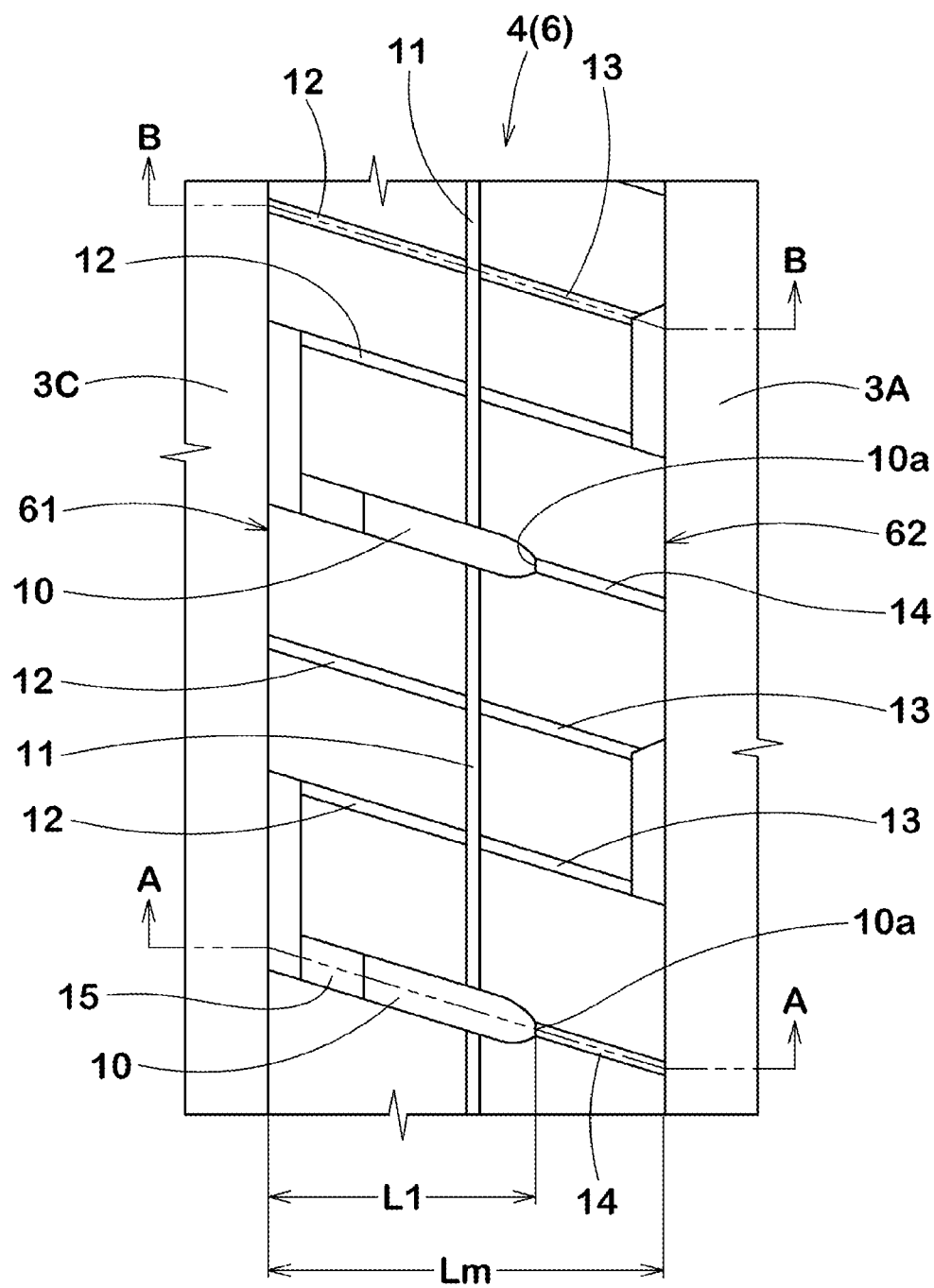
FIG. 2 is a partial enlarged view of an inboard middle land portion of FIG. 1.

FIG. 2 illustrates a partial enlarged view of the inboard middle land portion 6. As illustrated in FIG. 2, in this embodiment, the inboard middle land portion 6 is provided with at least one lateral groove 10, at least one first sipe 11, at least one second sipe 12, and at least one third sipe 13. In this embodiment, a plurality of lateral grooves 10 and a plurality of the respective sipes 11 to 13 are provided.

As used herein, "sipe" means a narrow cut or incision that has its width equal to or less than 2 mm, preferably of from 0.5 to 2.0 mm. On the other hand, "groove" means a void or recess that has its width more than 2.0 mm.

The lateral grooves 10 each extend from the first end 61 and travers the inboard middle land portion 6 partially to have a terminal end 10a thereof within the inboard middle land portion 6. That is, the lateral grooves 10 do not reach the second end 62 of the inboard middle land portion 6 directly. In this embodiment, the lateral grooves 10 extend from the first end 61 to the terminal ends 10a in a straight manner. In another aspect of the disclosure, one or more lateral grooves 10 may include a bent portion in order to increase the groove length or edge length. The lateral grooves 10, upon traveling on snow, generate snow-shearing force to enhance traction and/or braking force, resulting in improved snow road performance. Further, the lateral grooves 10 suppress effectively reduction in rigidity of the inboard middle land portion 6, resulting in suppressing deterioration of steering stability on dry roads.

Preferably, groove widths of the lateral grooves 10, for example, are in a range of from 5% to 15% of a pitch between a pair of lateral grooves 10 arranged adjacently in the tire circumferential direction. Specifically, the groove widths of the lateral grooves 10 are preferably equal to or less than 8.0 mm, more preferably of from 4.0 to 8.0 mm. In this embodiment, "groove width" is measured in a direction perpendicular to a longitudinal direction of the groove. In some preferred embodiments, the groove widths of lateral grooves 10 decrease gradually toward the respective terminal ends 10a. In this aspect, portions of the lateral grooves at which the groove widths become equal to or less than 2.0 mm initially are defined as the terminal ends 10a.

In this embodiment, the terminal ends 10a of lateral grooves 10 are located on the second end 62 side with respect to the axial center location of the inboard middle land portion 6. This structure can be helpful generating snow-shearing force in wider axial region. In order to enhance snow-shearing force while suppressing deterioration of steering stability on dry roads, axial lengths L1 of lateral grooves 10 are preferably in a range of from 60% to 80% of the maximum axial width Lm of the inboard middle land portion 6.

In order to exert better road scratching effect in the tire axial direction while suppressing reduction in lateral rigidity of the inboard middle land portion 6, the lateral grooves 10 are preferably inclined with respect to the tire axial direction. In some preferred embodiments, the lateral grooves 10 are inclined at angles of from 5 to 45 degrees, more preferably 5 to 30 degrees, yet further preferably 5 to 20 degrees. As to traction, in order to enhance snow-shearing force and road scratching effect maximumly, the lateral grooves 10 may include at least one lateral groove that extends in parallel with the tire axial direction.

Figure 3:
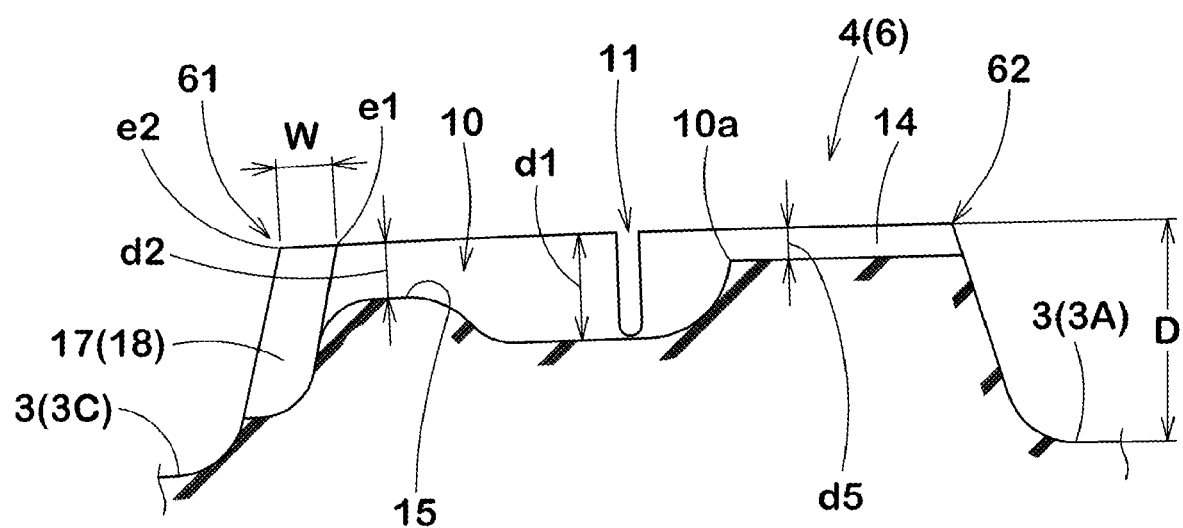
FIG. 3 is a cross-sectional view taken along line A-A of FIG. 2.

FIG. 3 illustrates a cross-sectional view taken along line A-A of FIG. 2. In order to generate powerful snow-shearing force, depths d1 of the lateral grooves 10 (i.e., the maximum depths when depths vary) are preferably in a range of from 25% to 100% of the maximum depth D of the main grooves 3, for example. In some preferred embodiments, the depths d1 are in a range of from 50% to 70% of the maximum depth D of the main grooves 3 in order to suppress effectively reduction in rigidity of the inboard middle land portion 6 while generating snow-shearing force.

In some preferred embodiments, at least one of the lateral grooves 10 is provided on the first end 61 side (i.e., an end side of the lateral groove connected to the main groove 3) with a shallow-bottom portion 15 where the bottom raises locally. The shallow-bottom portion 15, for example, has a depth d2 in a range of from 40% to 60% of the maximum depth d1 of the at least one of the lateral grooves 10.

Referring back to FIG. 2, the first sipes 11 each extend along the tire circumferential direction between a pair of lateral grooves 10 arranged adjacently in the tire circumferential direction. In this embodiment, the first sipes 11 extend straightly in parallel with the tire circumferential direction. In another aspect, one or more first sipes 11 may include a bent portion in order to increase an edge length.

In some preferred embodiments, at least one end of each of the first sipes 11 is in communication with one of the lateral grooves 10. More preferably, both ends of each of the first sipes 11 are in communication with the respective lateral grooves 10. Since the first sipes 11 have narrower widths than that of grooves, the first sipes 11 can improve steering stability on slippery snow roads by offering scratching effect upon cornering while suppressing reduction in rigidity of the inboard middle land portion 6.

In some preferred embodiments, the first sipes 11 are provided on the axial center location of the maximum width Lm of inboard middle land portion 6. Thus, well balance in rigidity of the inboard middle land portion 6 can be offered, resulting in better steering stability.

FIG. 3 illustrates a cross-sectional view of one first sipe 11. In order to suppress reduction in rigidity of the inboard middle land portion 6, depths of the first sipes 11 are preferably less than 100% of the maximum depth D of the main grooves 3, more preferably in a range of from 40 to 90%, yet further preferably in a range of from 40% to 60%. In this embodiment, the depths of first sipes 11 are the same as the maximum depth d1 of the lateral grooves 10. This structure can be helpful to suppress uneven wear that tends to be generated on connected portions between the first sipes 11 and the lateral grooves 10.

Referring back to FIG. 2, the second sipes 12 extend from the first end 61 of the inboard middle land portion 6 to the first sipes 11. In this embodiment, a plurality of second sipes 12 is provided between a pair of lateral grooves 10 arranged adjacently in the tire circumferential direction. The third sipes 13 extend from the second end 62 of the inboard middle land portion 6 to the first sipes 11. In this embodiment, a plurality of third sipes 13 is provided between a pair of lateral grooves 10 arranged adjacently in the tire circumferential direction.

In some preferred embodiments, the second sipes 12 and the third sipes 13 are arranged to divide a circumferential space between the pair of lateral grooves 10 equally (e.g., difference between the divided circumferential lengths of the space is within 5%). Such an arrangement can be helpful to suppress local reduction in rigidity of the inboard middle land portion 6, resulting in better steering stability on dry roads.

The second sipes 12 and the third sipes 13 are substantially connected to the first sipes 11. As used herein, regarding two sipes are "substantially connected" shall means that not only an aspect where two sipes are connected or communicated directly but also an aspect where two sipes are apart from each other with a gap equal to or less than 1 mm. In this embodiment, the second sipes 12 and the third sipes 13 are directly connected to the first sipes 11. This structure can offer substantially long continuous sipe edges from the first end 61 to the second end 62 of the inboard middle land portion 6, resulting in improving road scratching effect further.

Since the second sipes 12 and the third sipes 13 have widths narrower than that of grooves, the second sipes 12 and the third sipes 13 can offer superior scratching effect on snow roads in an axial wider region while suppressing reduction in rigidity of the inboard middle land portion 6 minimally.

The second sipes 12 and the third sipes 13 are communicated with the first sipe 11 at the same locations in the tire circumferential direction. Thus, since the second sipes 12 and the third sipes 13 may tend to open easily around the first sipes 11, powerful traction on snow roads can be offered. Note that two sipes are communicated with each other at the same location in the tire circumferential direction shall means that not only an aspect where the respective extended regions of two sipes in which the respective sipe ends are extended along the tire axial direction overlap with each other but also an aspect where the respective extended regions of two sipes are apart from each other within less than 2 mm in the tire circumferential direction. In some preferred embodiments, the respective extended regions of two sipes overlap with each other. As more preferred embodiments, in this embodiment, a pair of edges of each of the second sipes 12 is arranged to be continuous to a pair of edges of each of the third sipes 13 so as to form a pair of straight lines.

In this embodiment, the second sipes 12 and the third sipes 13 are arranged without intersecting the lateral grooves 10. Generally, intersections of grooves and sipes tends to reduce in rigidity of a land portion. In this embodiment, since the inboard middle land portion 6 has no intersections as described above, reduction in rigidity thereof can be suppressed. Thus, better steering stability on dry roads can be offered.

As described above, the tire 1 according to the embodiment can exert better steering stability and snow road performance. Further, the inboard middle land portion 6 and the outboard middle land portion 7 receive large tire load when not only straight traveling ahead but also cornering. Thus, by providing the lateral grooves 10 and the first to third sipes 11 to 13, the inboard middle land portion 6 and/or the outboard middle land portion 7 can exert effectively the superior performance as described above. In particular, in the current situation where negative camber suspensions are often employed to vehicles, it is preferable that the inboard middle land portion 6 is provided with the above mentioned lateral grooves 10 and first to third sipes 11 to 13. Note that the above arrangement of the lateral grooves and the sipes is not limited for the inboard middle land portion 6 but can be used for other land portions.

In some preferred embodiments, the second sipes 12 and the third sipes 13 are inclined at angles with respect to the tire axial direction, preferably of from 5 to 45 degrees, more preferably 5 to 30 degrees, yet further preferably 5 to 20 degrees in order to enhance road scratching effect in the tire axial direction while suppressing reduction in rigidity of the inboard middle land portion 6. In some more preferred embodiments, the second sipes 12 and the third sipes 13 are inclined in the same direction as the lateral grooves 10 with respect to the tire axial direction.

In some preferred embodiments, the second sipes 12, the third sipes 13 and the lateral grooves 10 extend in substantially parallel with each other. Here, "substantially" parallel is intended that "parallel" should not be construed as strict meaning like the mathematical meaning, by taking into consideration the tread portion 2 being formed curved surface and the tire being a vulcanized rubber product. In this meaning, an aspect that one ordinarily skilled in the art, at a glance, can be able to find it parallel, the aspect should be construed as substantially parallel. For example, as to concerned two grooves, when angle difference between two straight lines each of which passes both ends of the respective grooves is within about 10 degrees, more preferably within 5 degrees, the two grooves should be construed as substantially parallel. On the other hand, in order to improve road scratching effect for the ground maximumly, the second sipes 12 and the third sipes 13 may extend along the tire axial direction.

Figure 4:
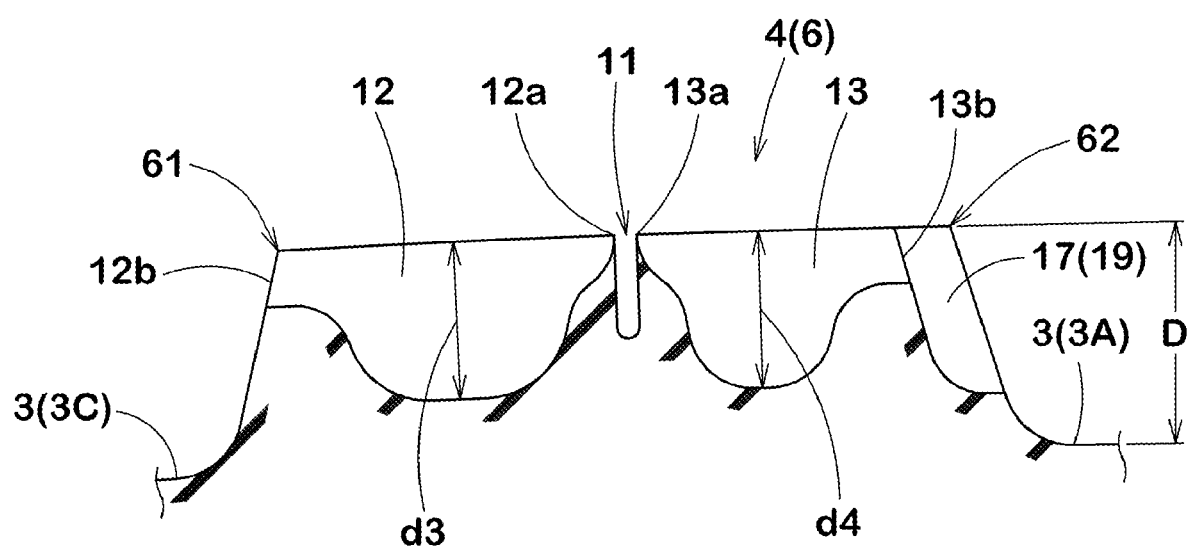
FIG. 4 is a cross-sectional view taken along line B-B of FIG. 2.

FIG. 4 illustrates a cross-sectional view taken along line B-B of FIG. 2. As illustrated in FIG. 4, each of the second sipes 12 according to the embodiment extends from the first end 61 toward one of the first sipes 11 and decreases the depth d3 gradually toward the end 12a which is on the side of the first sipe 11. In this embodiment, the end 12a of the second sipe 12 is located on one edge of the first sipes 11 located on the first end 61 side. Similarly, each of the third sipes 13 extends from the second end 62 toward one of the first sipes 11 and decreases the depth d4 gradually toward the end 13a which is located on the first sipe 11 side. In this embodiment, the end 13a of the third sipe 13 is located on the other edge of the first sipe 11 located on the second end 62 side. This structure can improve road scratching effect further by offering the long sipe edges which are substantially continuous from the first end 61 to the second end 62 while maintaining sufficient rigidity of an axial middle region of the inboard middle land portion 6.

In order to improve steering stability on dry roads, each of the second sipes 12 includes the deepest depth d3 and the depth decreases gradually toward the respective ends 12b and 12a which are on the first end 61 side and the first sipe 11 side, respectively. In this embodiment, the depth of the end 12b of the second sipe 12 is deeper than the depth of the end 12a. In some preferred embodiments, the depth of the end 12a is substantially zero as described above. Further, as each of the second sipes 12, it is preferable that the depth of the end 12b is shallower than the depth of the first sipe 11.

Similarly, each of the third sipes 13 includes the deepest depth d4 and the depth decreases gradually toward the respective ends 13b and 13a which are on the second end 62 side and the first sipe 11 side, respectively. In this embodiment, the depth of the end 13b of the third sipes 13 is deeper than the depth of the end 13a. In some preferred embodiments, the depth of the end 13a is substantially zero as described above. Further, as each of the third sipes 13, it is preferable that the depth of the end 13b is shallower than the depth of the first sipe 11.

It is preferable that the depth d3 of each of the second sipes 12 and the depth d4 of each of the third sipes 13 is deeper than the depths of the first sipes 11. In particular, the depths d3 and d4, for example, are preferably in a range of from 50% to 100%, more preferably 60% to 80% of the maximum depth D of the main groove 3.

According to the above aspect of the embodiment, around the location of the first ends 61, the second ends 62, and the first sipes 11 of the inboard middle land portion 6, the second sipes 12 and the third sipes 13 hardly open themselves upon grounding, and thus steering stability on dry roads can be improved. Further, the second sipes 12 and the third sipes 13 can open themselves widely on the respective axial middle regions upon traveling on compressed snow roads, thereby improving road scratching effect.

As illustrated in FIGS. 1 to 3, in some preferred embodiments, the inboard middle land portion 6 may be provided with one or more fourth sipes 14.

The fourth sipes 14 are connected to the terminal ends 10a of the lateral grooves 10. In some preferred embodiments, the fourth sipes 14 extend to the second end 62. This embodiment can offer long edges extending from the first end 61 to the second end 62 while suppressing reduction in rigidity of the inboard middle land portion 6. Thus, snow road performance can further be improved while suppressing deterioration of steering stability on dry roads. In particular, when terminal ends 10a of the lateral grooves 10 are configured to have decreased groove widths, rigidity change on connected portions between the terminal ends 10a and the fourth sipes 14 can be lower.

In this embodiment, the fourth sipes 14 extend in a straight manner. In another aspect, one or more fourth sipes 14 may include a bent portion in order to increase an edge length thereof. In a particularly preferred embodiment, the fourth sipes 14 extend in substantially parallel with the third sipes 13. Here, "substantially" parallel is as mentioned above. Alternatively, in order to enhance road scratching effect maximumly, the fourth sipes 14 may extend in substantially parallel with the tire axial direction.

In an aspect where the fourth sipes 14 are provided as illustrated in FIG. 3, the maximum depths d5 are preferably shallower than the respective depths of the first sipes 11, the second sipes 12 and the third sipes 13. In this embodiment, the depths d5 of fourth sipes 14 are substantially constant. Alternatively, the depths d5 may vary.

Figure 5:
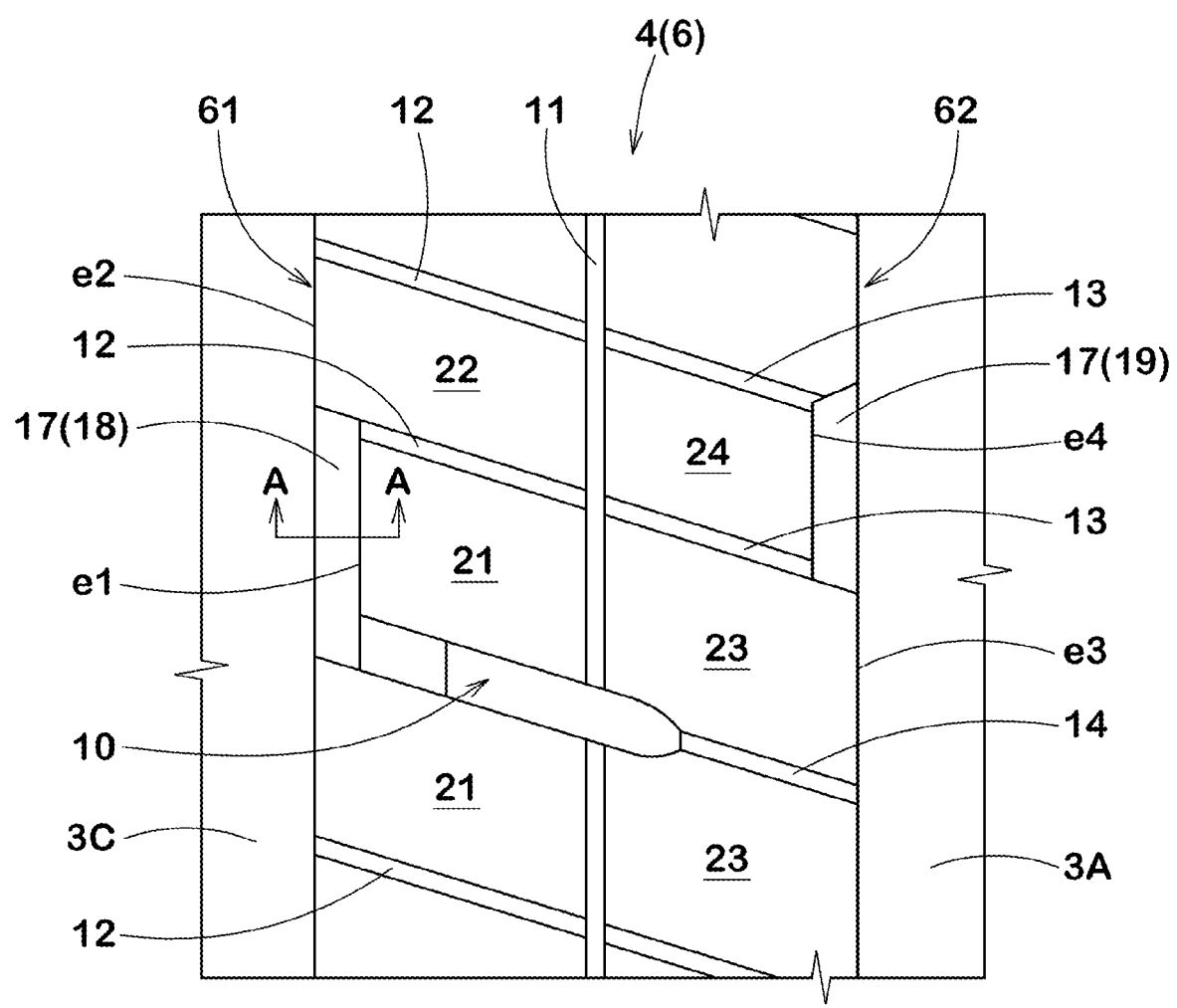
FIG. 5 is a partial enlarged view of FIG. 2.

FIG. 5 illustrates a partial enlarged view of the inboard middle land portion 6. As illustrated in FIG. 5, the inboard middle land portion 6 is preferably provided with one or more chamfered portions 17 each of which is a recessed portion depressed partially on a corner between the ground contact surface and one of the pair of land sidewalls. The chamfered portions 17, for example, include at least one first chamfered portion 18 provided on the first end 61 side so as to connect one lateral groove 10 and one second sipe 12 which are adjacent arranged. The first chamfered portion 18 can be helpful not only to form a large snow column in cooperation with the lateral groove 10 upon traveling on snow but also to release the snow column easily from the lateral groove 10 to exert superior snow road performance for a long period. In some preferred embodiments, the chamfered portions 17, for example, may include at least one second chamfered portion 19 provided on the second end 62 side so as to connect two third sipes 13 which are adjacent arranged. The second chamfered portion 19 can be improve snow road performance in cooperation with the first chamfered portion 18.

In order to improve steering stability on dry roads and snow road performance in a well-balanced manner, a circumferential length of the first chamfered portion 18 is in a range of from 0.30 to 0.50 times the pitch between a pair of lateral grooves 10 arranged adjacently in the tire circumferential direction.

Figure 6A:
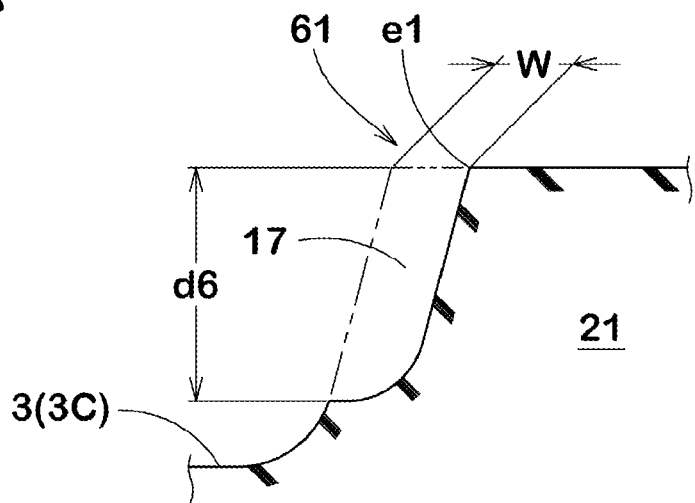
FIGS. 6A and 6B are cross-sectional views taken along line A-A of FIG. 5.

FIG. 6A illustrates a cross-sectional view taken along line A-A of FIG. 5. As illustrated in FIG. 5 and FIG. 6A, in this embodiment, the chamfered portions 17 have depths d6 in a range of from 30% to 100%, more preferably 50% to 100% of the maximum depth D of the main groove 3 (shown in FIG. 3). Similarly, axial widths W of the chamfered portions 17 are preferably in a range of from 0.5 to 5 mm, for example.

Figure 6B:
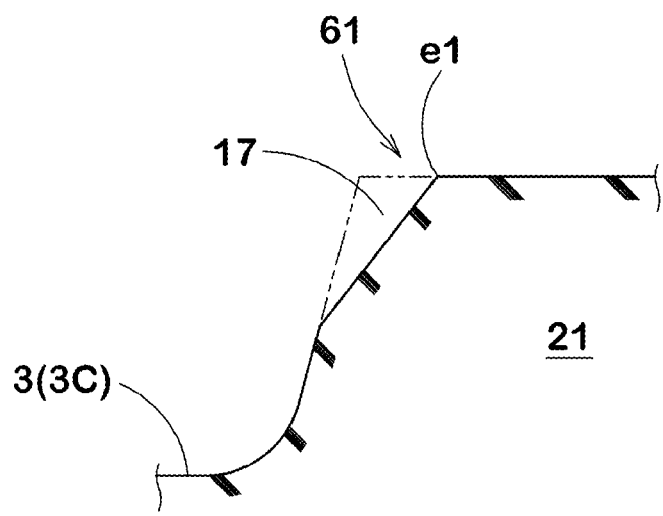

As illustrated in FIG. 6B, in another aspect, the chamfered portions 17, for example, may be configured as a slant plane extending in a straight manner in the cross-sectional view.

As illustrated in FIG. 3 and FIG. 4, the first chamfered portion 18 and the second chamfered portion 19, for example, preferably have the respective depths which are deeper than the depths of the first sipes 11. Further, the first chamfered portion 18 and the second chamfered portion 19 preferably have the respective depths which are deeper than the depths of the lateral grooves 10. These chamfered portions 17 can offer powerful snow-shearing force.

As illustrated in FIG. 5, in a plan view of the tread portion, an angle between the first chamfered portion 18 and the lateral groove 10 is preferably an obtuse angle. Thus, upon traveling on snow roads, snow held in the lateral groove 10 and the first chamfered portion 18 is compressed integrally and, then is released therefrom easily to exert superior snow road performance for a long period.

Preferably, the first chamfered portion 18 is arranged in the different location from the second chamfered portion 19 in the tire circumferential direction. Thus, upon tire traveling, the chamfered portions 17 come into contact with the ground alternately between the first end 61 and the second end 62 of the inboard middle land portion 6, resulting in enhancing snow-shearing force in a well-balanced manner.

Preferably, a region in which the second chamfered portion 19 is axially projected on the first end 61 overlaps the first chamfered portion 18 at least partially. The arrangement of the chamfered portions 17 as such may further improve snow road performance.

The inboard middle land portion 6 is divided by the lateral grooves 10 and the respective sipes to include a plurality of first blocks 21 and a plurality of second blocks 22.

Each of the first blocks 21 is divided by one second sipe 12 and one lateral groove 10 which are adjacently arranged in the tire circumferential direction. The first block 21 includes a circumferentially extending edge e1 on the first end 61 side. Each of the second blocks 22 is divided by a pair of circumferentially adjacent second sipes 12. The second block 22 includes a circumferentially extending edges e2 on the first end 61 side. The edge e1 of the first block 21 is located inwardly of the edge e2 of the second block 22 in a width direction of the inboard middle land portion 6. The edge e1 of the first block 21, for example, is shaped by the first chamfered portion 18.

According to the above aspect, the inboard middle land portion 6 has an irregular circumferentially extending end which increases edge component on the first end 61 side. Thus, this can help to improve scratching effect on slippery roads. Further, step portion formed between circumferentially adjacent edges e1 and e2 can generate snow-shearing force. Furthermore, since the edge e1 of the first block 21 is connected to the lateral groove 10, snow compressed in the lateral groove 10 tends to be discharged easily toward the main groove 3, and thus a self-cleaning feature of the lateral groove 10 can be improved, for example. Accordingly, the above aspect of the disclosure can further improve snow road performance.

The inboard middle land portion 6 is further provided with a plurality of third blocks 23 and a plurality of fourth blocks 24.

Each of the third blocks 23 is divided by one third sipe 13 and one lateral groove 10 which are adjacently arranged in the tire circumferential direction (and one fourth sipe 14). Each third block 23 includes a circumferentially extending edge e3 on the second end 62 side. Each of the fourth blocks 24 is divided by circumferentially adjacent two third sipes 13. Each fourth block 24 includes a circumferentially extending edge e4 on the second end 62 side. The edge e4 of the fourth block 24 is located inwardly of the edge e3 of the third block 23 in the axial width direction of the inboard middle land portion 6. The edge e4 of the fourth block 24, for example, is shaped by the second chamfered portion 19.

Figure 7:
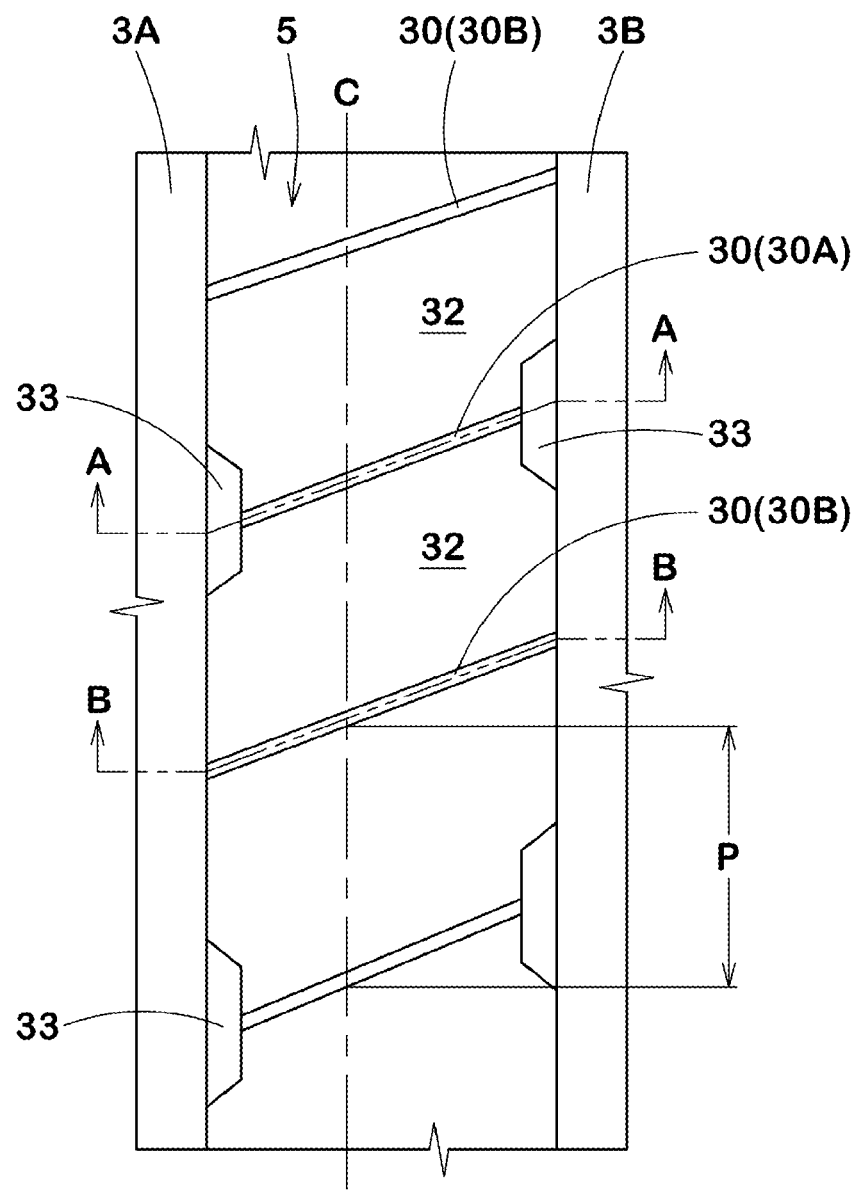
FIG. 7 is an enlarged view of a crown land portion of FIG. 1.

FIG. 7 illustrates a partial enlarged view of the crown land portion 5 of FIG. 1. The crown land portion 5 is provided with a plurality of crown sipes 30. In this embodiment, each of the crown sipes 30 extends in a straight manner. In another aspect, one or more crown sipes 30 may include a bent portion in order to increase an edge length thereof.

In some preferred embodiments, the crown sipes 30 are inclined with respect to the tire axial direction, more preferably at angles of from 5 to 45 degrees, more preferably 5 to 30 degrees, yet further preferably 5 to 20 degrees in order to enhance road scratching effect in the tire axial direction while suppressing reduction in lateral rigidity of the crown land portion 5. More preferably, the crown sipes 30 are inclined in an opposite direction to the second sipes 12, the third sipes 13 and the lateral grooves 10 with respect to the tire axial direction as this embodiment.

In some preferred embodiments, each of the crown sipes 30 extends over the entire axial width of the crown land portion 5. Thus, the crown land portion 5 is divided into a plurality of crown blocks 32. Since the crown land portion 5 tends to receive large ground contact pressure relatively, it is preferable that circumferential lengths of the crown blocks 32 are greater than the respective circumferential lengths of the blocks provided on the inboard middle land portion 6. It is preferable that the lengths of the crown blocks 32 are equal to or more than 1.3 times, yet further preferably equal to or more than 1.4 times the respective circumferential lengths of the blocks provided on the inboard middle land portion 6.

In some preferred embodiments, the crown land portion 5 is provided with one or more chamfered portions 33 each of which is a recessed portion depressed partially on a corner between the ground contact surface and one land sidewall. The chamfered portions 33, for example, have the circumferential lengths greater than the axial lengths. In this embodiment, the chamfered portions 33 are provided both axial end sides of the crown land portion 5. Each of the chamfered portions 33 can generate snow-shearing force to improve snow road performance further. Note that the same structure of the chamfered portions 17 provided on the inboard middle land portion 6 can be preferably employed as to the specific structure of the chamfered portions 33.

It is preferable that the chamfered portions 33 provided on the crown land portion 5, for example, have the circumferential lengths smaller than that of the chamfered portions 17 provided on the inboard middle land portion 6. Thus, uneven wear on the crown land portion 5 can be suppressed.

In some preferred embodiments, each of the chamfered portions 33 is arranged in communication with one of the crown sipes 30.

In this embodiment, the crown sipes 30 include one or more first crown sipes 30A each having at least (both ends in the embodiment) one end in communication with one of the chamfered portions 33, and one or more second crown sipes 30B each having both ends which are not communicated with any chamfered portions 33. In some preferred embodiments, the first crown sipes 30A and the second crown sipes 30B are arranged alternately in the tire circumferential direction. Thus, snow road performance of the tire can further be improved while suppressing deteriorating steering stability on dry roads.

Figure 8A:
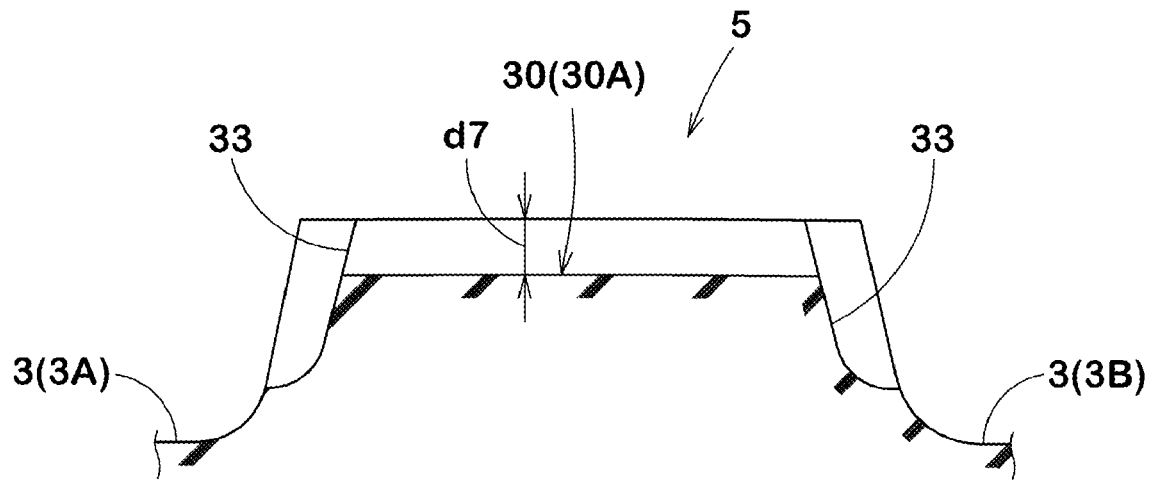
FIGS. 8A and 8B are cross-sectional views taken along lines A-A and B-B of FIG. 7, respectively.

FIG. 8A illustrates a cross-sectional view taken along line A-A of FIG. 7. As illustrated in FIG. 8A, each of the first crown sipes 30A, for example, has a constant depth d7. In order to improve snow road performance while suppressing reduction in rigidity of the crown land portion 5, the depth d7 of the first crown sipes 30A, for example, is preferably shallower than the depths of the chamfered portions 33. Preferably, the depth d7 may be equal to or less than 30% of the maximum depth D of the main grooves 3, more preferably in a range of from 10% to 30% of the depth D.

Figure 8B:
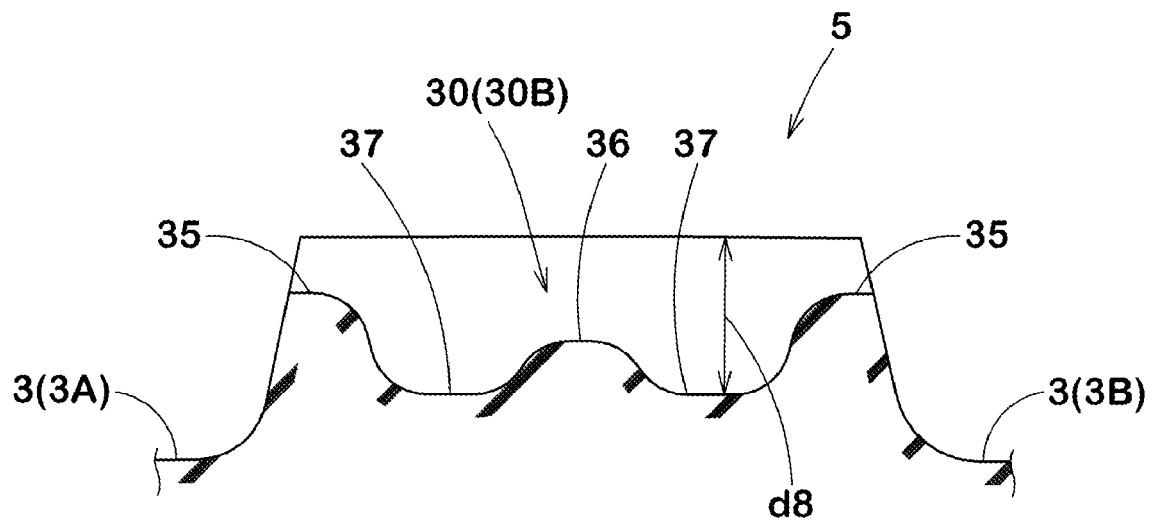

FIG. 8B illustrates a cross-sectional view taken along line B-B of FIG. 7. As illustrated in FIG. 8B, the second crown sipes 30B, for example, have depths varying in three steps. In this embodiment, the second crown sipes 30B each, in the ascending order in depth, include at least one first portion 35, at least one second portion 36 and at least one third portion 37.

In this embodiment, each axial end side of each second crown sipe 30B is formed as the first portion 35. The depth of the first portion 35, for example, is the same as the depth d7 of the first crown sipe 30A as shown in FIG. 8A. The second portion 36 is provided on an axial middle region of each second crown sipe 30B. The third portion 37 is provided between the second portion 36 and the respective first portions 35. In order to improve snow road performance further while suppressing reduction in rigidity of the crown land portion 5, the depth d8 of the third portion 37, for example, is preferably equal to or more than 50% of the maximum depth D of the main grooves 3, more preferably in a range of from 65% to 80% of the maximum depth D.

Figure 9:
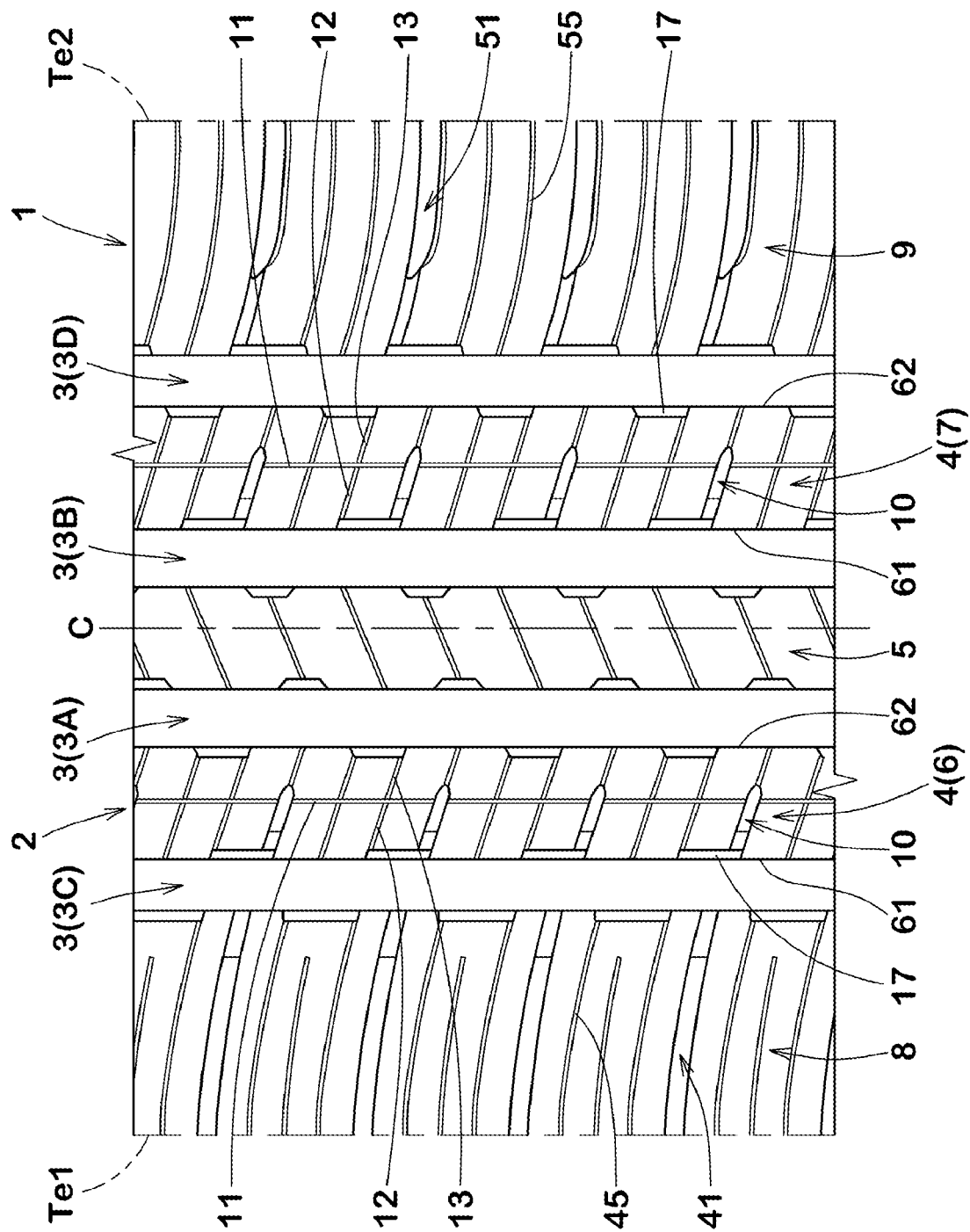
FIG. 9 is a development view of a tread portion of a tire in accordance with another embodiment of the present disclosure.

FIG. 9 illustrates a development view of the tread portion 2 of the tire 1 in accordance with another embodiment of the present disclosure. As illustrated in FIG. 9, the tread portion 2 includes the inboard middle land portion 6 and the outboard middle land portion 7 which are arranged such that the tire equator C is located therebetween. Both inboard middle land portion 6 and outboard middle land portion 7 have the same configuration as the above-mentioned inboard middle land portion 6. Further, the crown land portion 5 of this embodiment has the same configuration as the above-mentioned crown land portion 5.

Each of the inboard middle land portion 6 and the outboard middle land portion 7 have the first end 61 and second end 62. The first end 61 of the inboard middle land portion 6 is defined as an axial end on the inboard tread edge Te1 side of the inboard middle land portion 6. The first end 61 of the outboard middle land portion 7 is defined as an axial end on the inboard tread edge Te1 side of the outboard middle land portion 7. The second end 62 of the inboard middle land portion 6 is defined as an axial end on the outboard tread edge Te2 side of the inboard middle land portion 6. The second end 62 of the outboard middle land portion 7 is defined as an axial end on the outboard tread edge Te2 side of the outboard middle land portion 7.

As illustrated in FIG. 9, the outboard middle land portion 7 preferably has an axial width being greater than the axial width of the inboard middle land portion 6. Preferably, the axial width of the outboard middle land portion 7, for example, is in a range of from 1.05 to 1.10 times the axial width of the inboard middle land portion 6 in order to enhance rigidity of the outboard middle land portion 7 to improve steering stability.

Preferably, axial lengths of the lateral grooves 10 provided on the outboard middle land portion 7 are greater than axial lengths of the lateral grooves 10 provided on the inboard middle land portion 6.

In some preferred embodiment, a ratio of the axial lengths of the lateral grooves 10 provided on the outboard middle land portion 7 to the axial width of the outboard middle land portion 7 is in a range of from 0.95 to 1.05 times a ratio of the axial lengths of the lateral grooves 10 provided on the inboard middle land portion 6 to the axial width of the inboard middle land portion 6. This structure may suppress uneven wear on the inboard middle land portion 6 and the outboard middle land portion 7.

Figure 10:
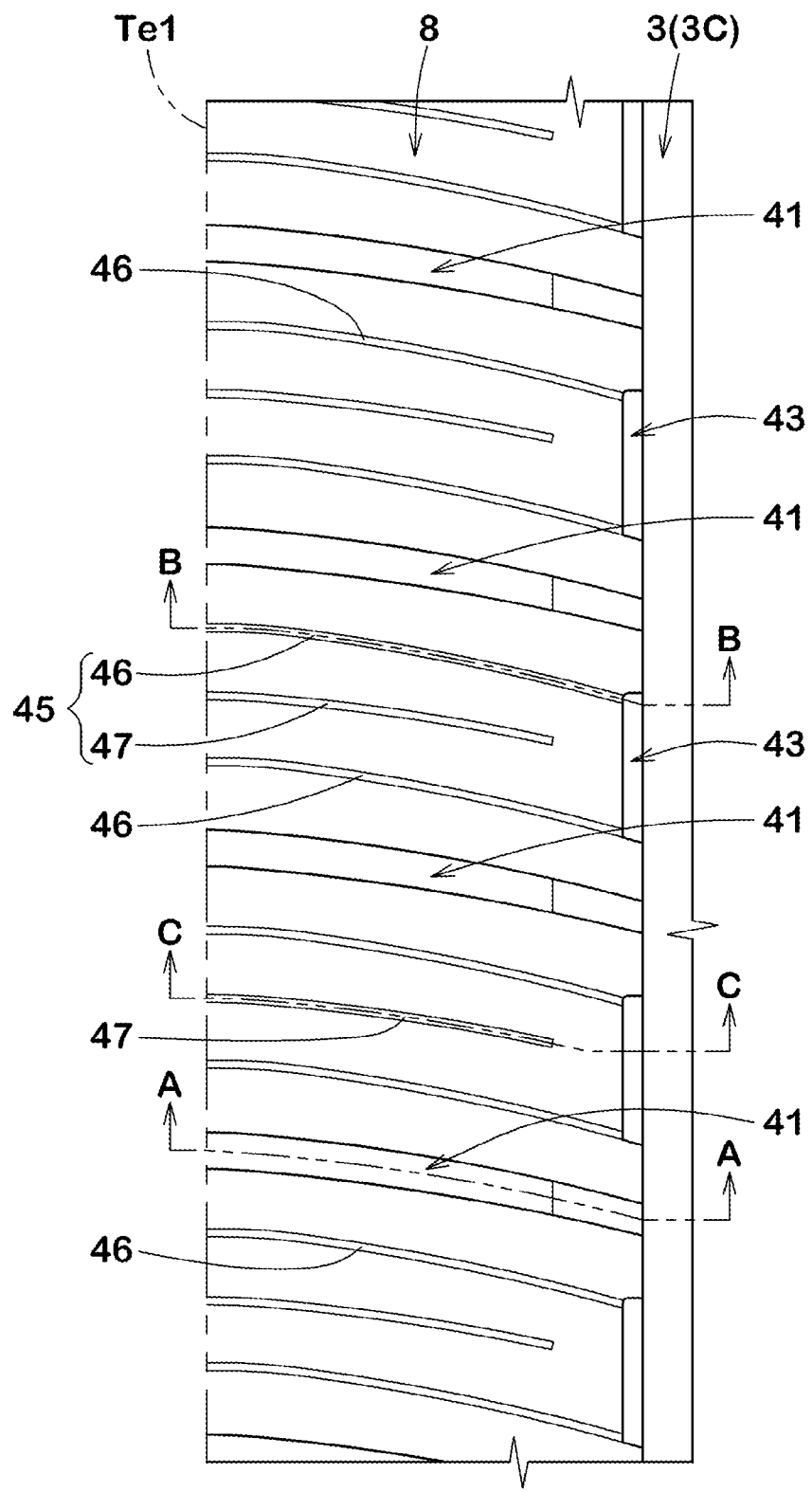
FIG. 10 is a partial enlarged view of the inboard middle land portion of FIG. 9.

FIG. 10 illustrates an enlarged view of the inboard shoulder land portion 8 of FIG. 9. As illustrated in FIG. 10, the inboard shoulder land portion 8, for example, is provided with one or more inboard shoulder lateral grooves 41, one or more chamfered portions 43 each of which is a recessed portion depressed partially on a corner between the ground contact surface and one of the pair of land sidewalls, and one or more inboard shoulder sipes 45.

Preferably, the inboard shoulder lateral grooves 41, for example, extend from the inboard shoulder main groove 3C to the inboard tread edge Te1. In this embodiment, the inboard shoulder lateral grooves 41, for example, extend in a constant width. Preferably, groove widths of the inboard shoulder lateral grooves 41 are greater than the groove widths of the lateral grooves 10 provided on the inboard middle land portion 6.

Preferably, the inboard shoulder lateral grooves 41, for example, are inclined in the same direction with respect to the tire axial direction as the lateral grooves 10 provided on the inboard middle land portion 6. The inboard shoulder lateral grooves 41, for example, are inclined at angles of from 5 to 15 degrees with respect to the tire axial direction.

Figure 11A:
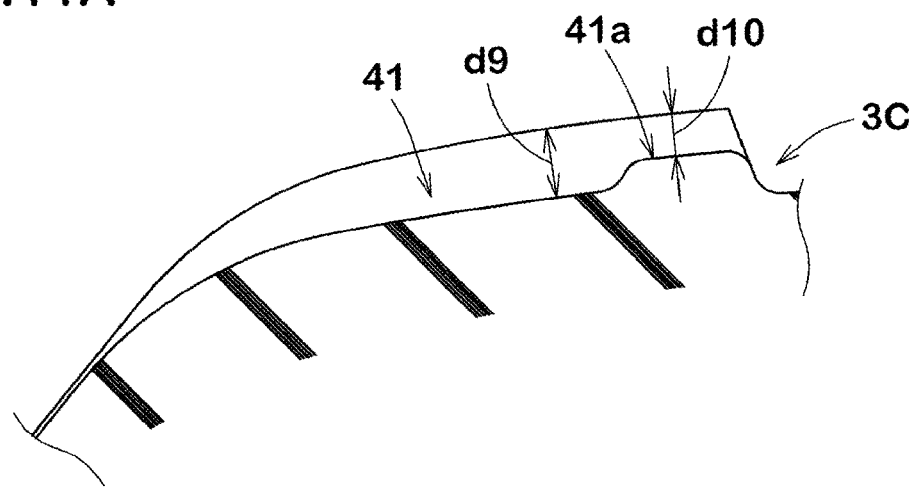
FIGS. 11A, 11B, and 11C are cross-sectional views taken along lines A-A, B-B, and C-C of FIG. 10, respectively.

FIG. 11A illustrates a cross-sectional view taken along line A-A of FIG. 10. As illustrated in FIG. 11A, each of the inboard shoulder lateral grooves 41 is provided with a shallow-bottom portion 41a configured to have a shallow depth locally on the inboard shoulder main groove 3C side. Preferably, the shallow-bottom portion 41a, for example, has a depth d10 of from 40% to 60% of the maximum depth d9 of the inboard shoulder lateral groove 41.

Referring back to FIG. 10, each of the chamfered portions 43, for example, is arranged between a pair of inboard shoulder lateral grooves 41 arranged adjacently in the tire circumferential direction. In this embodiment, the chamfered portions 43, for example, are configured to have substantially the same cross-sections as the chamfered portions 17 provided on the inboard middle land portion 6. In this embodiment, the chamfered portions 43 are not communicated with any inboard shoulder lateral grooves 41. The chamfered portions 43 as such may improve snow road performance.

Preferably, circumferential lengths of the chamfered portions 43 provided on the inboard shoulder land portion 8 are greater than the circumferential length of the chamfered portions 17 provided on the inboard middle land portion 6. The chamfered portions 43 as such may be helpful to uniform wear progress between the inboard shoulder land portion 8 and the inboard middle land portion 6, and thus superior wear resistance can be offered.

The inboard shoulder sipes 45, for example, include one or more first inboard shoulder sipes 46 traversing the inboard shoulder land portion 8 completely. and one or more second inboard shoulder sipes 47 extending from the inboard tread edge Te1 toward the tire equator C and terminating within the inboard shoulder land portion 8.

Preferably, each of the first inboard shoulder sipes 46, for example, are in communication with one of the chamfered portions 43. In this embodiment, two first inboard shoulder sipes 46 are arranged between a pair of inboard shoulder lateral grooves 41 which are arranged adjacently in the tire circumferential direction, and the two first inboard shoulder sipes 46 are in communication with the respective circumferential ends of one chamfered portion 43. The first inboard shoulder sipes 46 may be useful to enhance traction on snow roads.

Figure 11B:
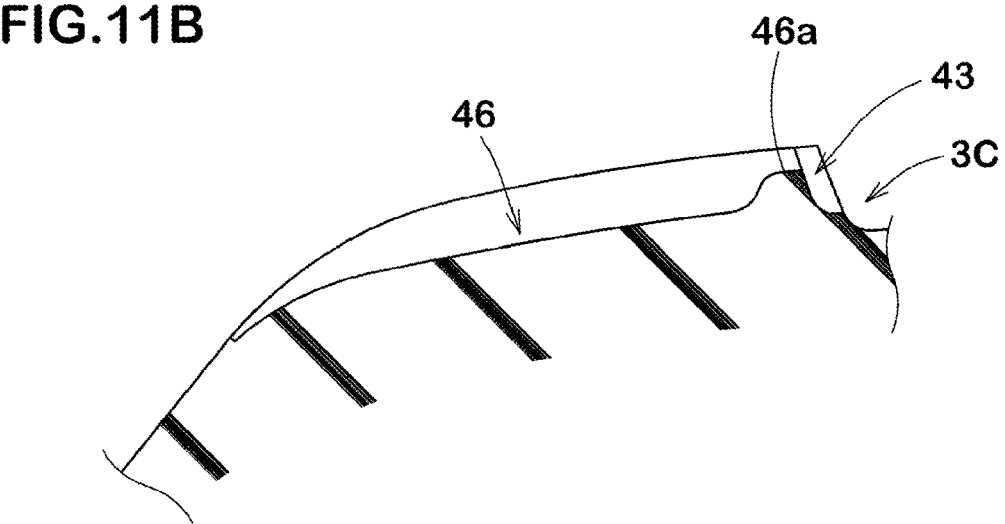

FIG. 11B illustrates a cross-sectional view taken along line B-B of FIG. 10. As illustrated in FIG. 11B, each of the first inboard shoulder sipes 46 is preferably provided with a shallow-bottom portion 46a configured to have a shallow depth locally on the chamfered portion 43 side. The first inboard shoulder sipes 46 can improve steering stability and snow road performance in a well-balance manner.

Figure 11C:
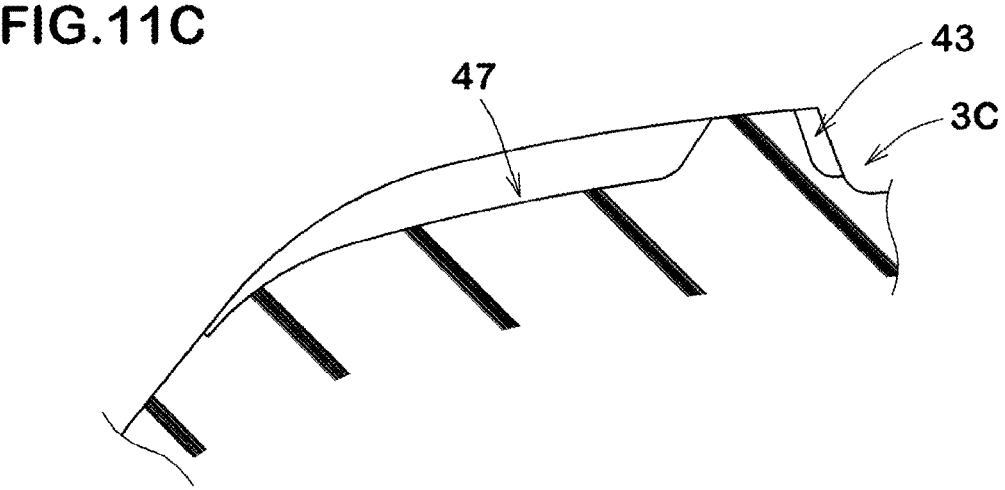

Referring back to FIG. 10, the second inboard shoulder sipes 47 are preferably arranged such that one is provided between a pair of first inboard shoulder sipes 46 which are adjacently arranged in the tire circumferential direction. FIG. 11C illustrates a cross-sectional view taken along line C-C of FIG. 10. As illustrated in FIG. 11C, the second inboard shoulder sipes 47 are preferably configured to have terminal ends within the inboard shoulder land portion 8, wherein depths of the sipes decrease toward its terminal ends locally.

Figure 12:
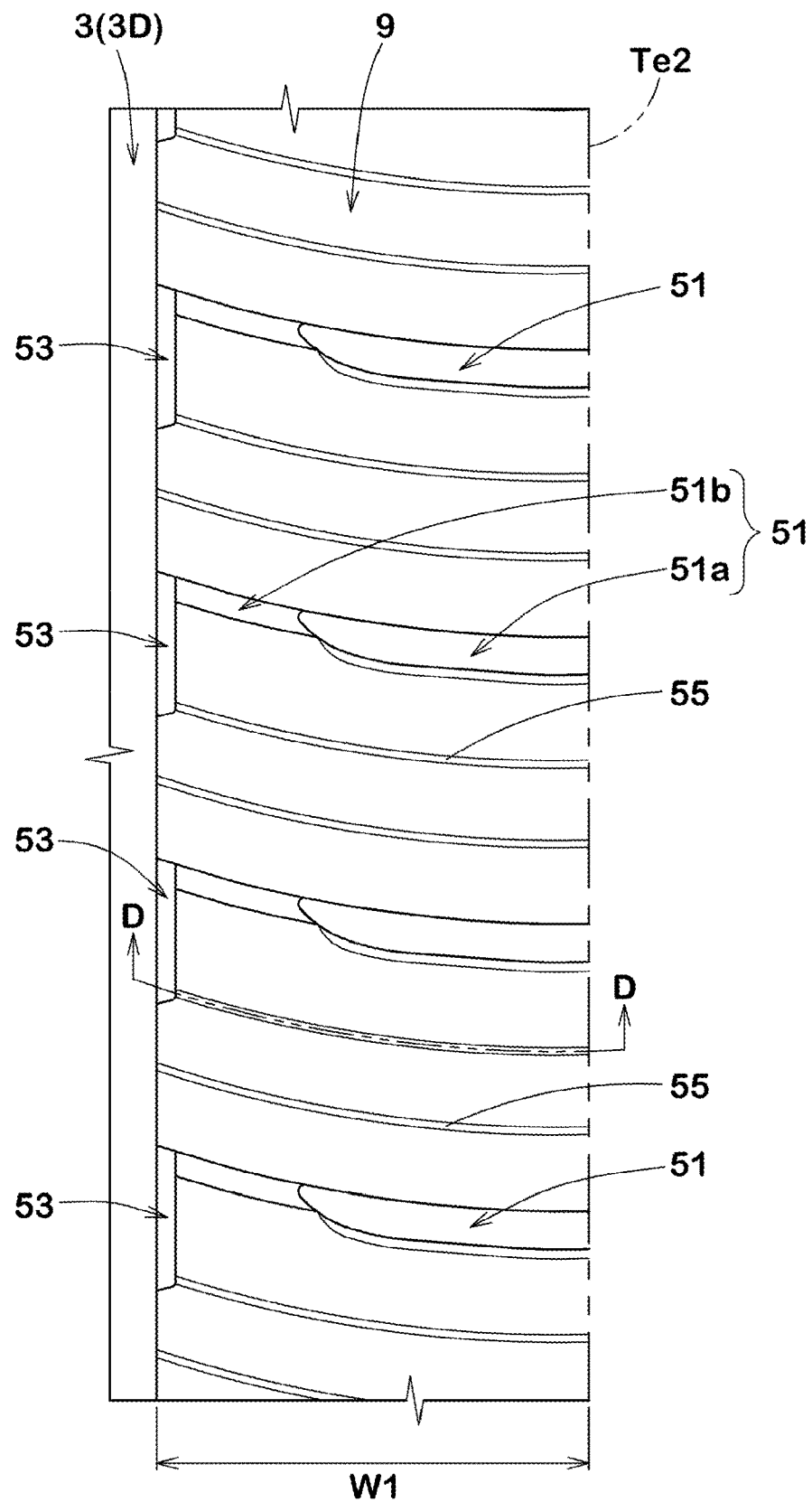
FIG. 12 is an enlarged view of an outboard shoulder land portion of FIG. 9.

FIG. 12 illustrates an enlarged view of the outboard shoulder land portion 9. As illustrated in FIG. 12, the outboard shoulder land portion 9, for example, is provided with outboard shoulder lateral grooves 51, outboard shoulder sipe 55 and one or more chamfered portions 53 each of which is a recessed portion depressed partially on a corner between the ground contact surface and one of the pair of land sidewalls.

Preferably, the outboard shoulder lateral grooves 51 extend from the outboard shoulder main groove 3D to the outboard tread edge Te2. In this embodiment, the outboard shoulder lateral grooves 51, for example, each include outer portion 51a on the outboard tread edge Te2 side and an inner portion 51b on the outboard shoulder main groove 3D side. The inner portion 51b has a depth and width being smaller than those of the outer portion 51a, improving snow road performance while maintaining steering stability on dry roads.

The chamfered portions 53 provided on the outboard shoulder land portion 9, for example, are configured to have substantially the same cross-sections as the chamfered portions 17 provided on the middle land portions 4. Preferably, the chamfered portions 53 are in communication with the inner portions 51b of the outboard shoulder lateral grooves 51. In this embodiment, the chamfered portions 53 have circumferential lengths which are longer than that of the chamfered portions 17 provided on the inboard and outboard middle land portions 4.

The outboard shoulder sipe 55, for example, extend from the outboard tread edge Te2 to the outboard shoulder main groove 3D. The outboard shoulder sipe 55, for example, may be connected to the chamfered portions 53.

Figure 13:
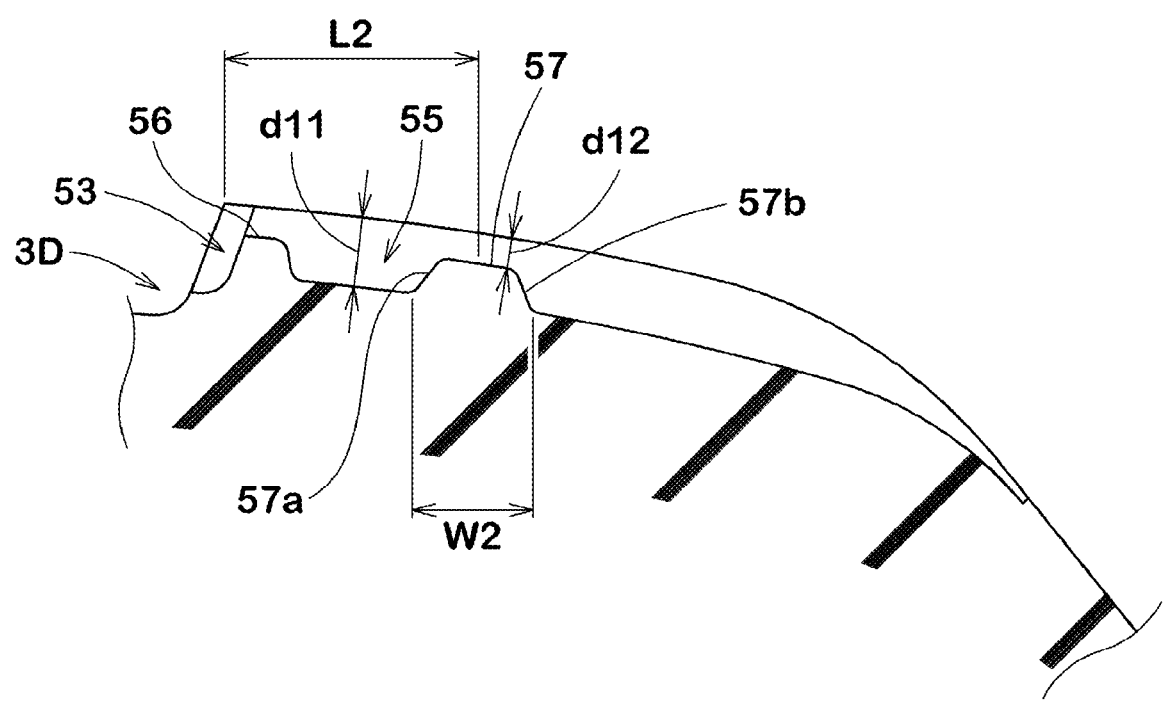
FIG. 13 is a cross-sectional view taken along line D-D of FIG. 12.

FIG. 13 illustrates a cross-sectional view of one of the outboard shoulder sipe 55 taken along line D-D of FIG. 12. As illustrated in FIG. 13, in this embodiment, each outboard shoulder sipe 55, for example, includes an end-side shallow-bottom portion 56 where a sipe bottom on the outboard shoulder main groove 3D side raises locally, and a middle shallow-bottom portion 57 where the sipe bottom between the outboard shoulder main groove 3D and the outboard tread edge Te2 raises locally. The end-side shallow-bottom portion 56 and the middle shallow-bottom portion 57 can suppress excessive opening of the outboard shoulder sipe 55 to improve snow road performance while suppressing steering stability.

In order to improve steering stability and snow road performance in a well-balanced manner, depths d12 of the end-side shallow-bottom portion 56 and the middle shallow-bottom portion 57 are preferably in a range of from 0.40 to 0.60 times the maximum depth d11 of the outboard shoulder sipe 55. Specifically, the maximum depth d11, for example, is of from 4.0 to 5.5 mm, and the depth d12, for example, is of from 2.1 to 2.6 mm.

An axial distance L2 from the axially inner edge of the outboard shoulder land portion 9 (i.e. except the chamfered portions 53) to the axial center location of the middle shallow-bottom portion 57 is preferably in a range of from 0.35 to 0.55 times the axial width W1 of the outboard shoulder land portion 9 (shown in FIG. 12). Such a middle shallow-bottom portion 57 can be useful to suppress excessive opening the outboard shoulder sipe 55 effectively.

An axial width W2 of the middle shallow-bottom portion 57, for example, is in a range of from 0.15 to 0.25 times the axial width W1 of the outboard shoulder land portion 9. The middle shallow-bottom portion 57 includes a first slope 57a on the outboard shoulder main groove 3D side, and the first slope 57a has an angle of from 30 to 45° degrees with respect to the tire radial direction, for example. The middle shallow-bottom portion 57 includes a second slope 57b on the outboard tread edge Te2 side, and the second slope 57b has an angle of from 15 to 45 degrees with respect to the tire radial direction, for example. The middle shallow-bottom portion 57 as such can improve steering stability and snow road performance in a well-balanced manner.

While the particularly preferable embodiments in accordance with the present disclosure have been described in detail, the present disclosure is not limited to the illustrated embodiments but can be modified and carried out in various aspects.

Example 1

In order to confirm advantageous effects of the disclosure, pneumatic tires 245/60R18 with a basic tread pattern as shown in FIG. 1 were manufactured by way of trial based on the specification in Table 1, and then steering stability on dry roads and snow performance of each test tire was tested. Note that the test tires had the same configuration as each other except the inboard middle land portion. Further, the maximum depth of the main grooves was 7.9 mm. The testing methods are as follows.

Snow Road Performance Test:

A test driver drove a four-wheel drive vehicle with four test tires on a compressed snow road, and then evaluated traction, cornering response and braking property totally by the driver's sense. The test results are shown in Table 1 by a score system in which the comparative example (Ref 1) is assumed to be 100. The larger numeric value indicates better the performance.

Steering Stability Test:

A test driver drove a four-wheel drive vehicle with four test tires on a dry asphalt road, and then evaluated steering response, rigidity and grip by the driver's sense. The test results are shown in Table 1 by a score system in which the comparative example (Ref 1) is assumed to be 100. The larger numeric value indicates better steering stability.

Table 1 shows the test results. As apparent from Table 1, it is confirmed that the example tires according to the disclosure improve steering stability on asphalt road and snow performance in a well-balanced manner.

TABLE 1

|  | Ex. 1 | Ex. 2 | Ex. 3 | Ex. 4 | Ex. 5 | Ex. 6 | Ex. 7 | Ex. 8 | Ex. 9 | Ref. 1 |
|---|---|---|---|---|---|---|---|---|---|---|
| Ratio L1/Lm of lateral groove lengths (%) | 70 | 45 | 85 | 70 | 70 | 70 | 70 | 70 | 70 | 100 |
| Ratio d1/D of lateral groove depths (%) | 47 | 47 | 47 | 65 | 30 | 47 | 47 | 47 | 47 | 47 |
| Lateral groove angles (deg.) | 15 | 15 | 15 | 15 | 15 | 35 | 15 | 15 | 15 | 15 |
| Second sipe angles (deg.) | 15 | 15 | 15 | 15 | 15 | 35 | 15 | 15 | 15 | 15 |
| Third sipe angles (deg.) | 15 | 15 | 15 | 15 | 15 | 35 | 15 | 15 | 15 | 15 |
| Chamfered portion widths W (mm) | 3 | 3 | 3 | 3 | 3 | 3 | 6 | — | — | — |
| Ratio d6/D of chamfered portion depths (%) | 50 | 50 | 50 | 50 | 50 | 50 | 50 | — | — | — |
| Ratio d5/D of fourth sipe depths (%) | 25 | 25 | 25 | 25 | 25 | 25 | 25 | 25 | — | — |
| Snow road performance (score) | 97 | 90 | 100 | 100 | 90 | 100 | 100 | 95 | 95 | 100 |
| Steering stability (score) | 115 | 120 | 110 | 110 | 120 | 105 | 105 | 110 | 110 | 100 |

*Angles mean angles with respect to tire axial direction.

Example 2

Figure 14:
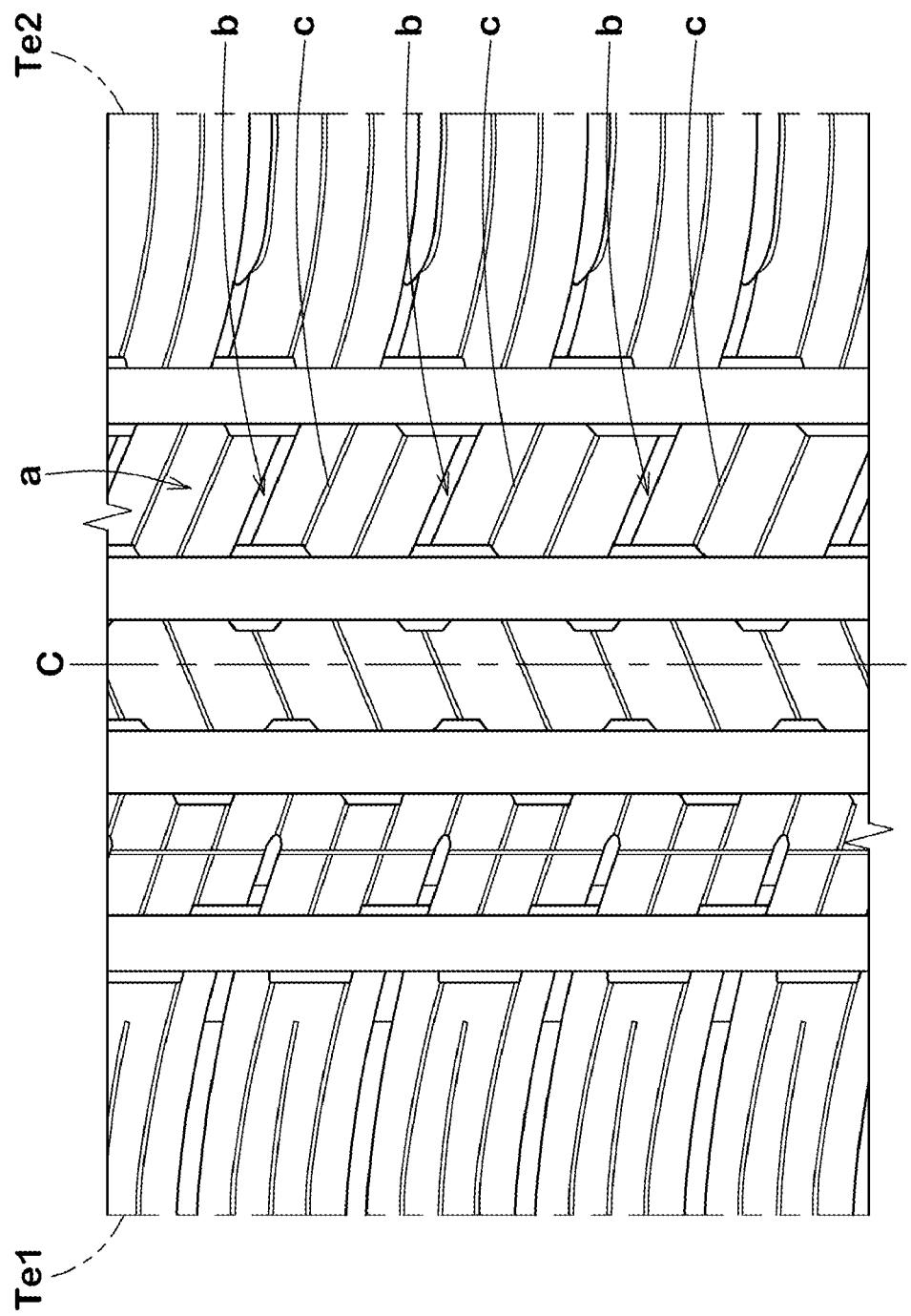
FIG. 14 is a development view of a tread portion of a tire in accordance with a reference example.

Pneumatic tires 245/60R18 with a basic tread pattern as shown in FIG. 9 were manufactured by way of trial based on the specification in Table 2, and then steering stability on dry roads and snow performance of each test tire was tested. As to a reference example, a tire having a tread pattern as illustrated in FIG. 14 was also manufactured. In FIG. 14, the outboard middle land portion (a) is provided with lateral grooves (b) and sipes (c) which traverse the land portion completely. Further, the land portion (a) is not provided with any circumferentially extending sipes. The tread pattern as illustrated in FIG. 14 had the same as the tread pattern illustrated in FIG. 9 except the outboard middle land portion (a). The common specification and the testing methods of the test tires are as follows.

Test vehicle: four-wheel drive vehicle with 3600 cc with displacement
Tire location(s): all wheels
Rim size: 18×7.5 J
Tire inner pressure: 240 kPa
Snow Road Performance Test:

A test driver drove the above-mentioned vehicle on a snowy road, and then evaluated driving performance by the driver's sense. The test results are shown in Table 2 by a score system in which the reference example (Ref) is assumed to be 100. The larger numeric value indicates better the performance.
Steering Stability Test:

A test driver drove the above-mentioned vehicle on a dry asphalt road, and then evaluated steering stability by the driver's sense. The test results are shown in Table 2 by a score system in which the reference example (Ref.) is assumed to be 100. The larger numeric value indicates better the performance.

Table 2 shows the test results.

As apparent from Table 2, it is confirmed that the example tires according to the disclosure improve steering stability on asphalt road and snow performance in a well-balanced manner.

Figure 15:
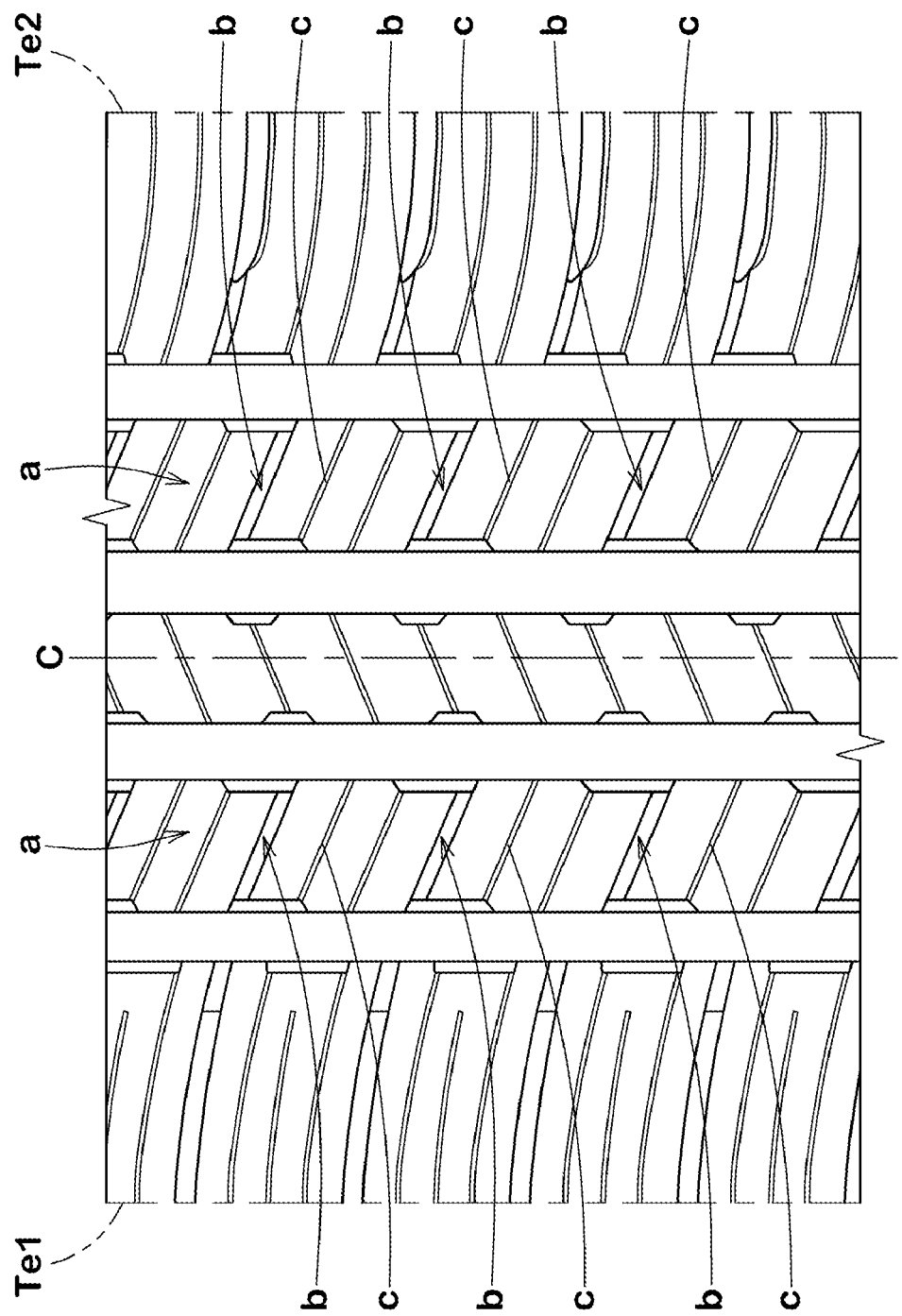
FIG. 15 is a development view of a tread portion of a tire in accordance with a comparative example 2.

Pneumatic tires 245/60R18 with a basic tread pattern as shown in FIG. 9 were manufactured by way of trial based on the specification in Table 3, and then steering stability on dry roads and snow performance of each test tire was tested. As to a comparative example 2 (Ref 2), a tire having a tread pattern as illustrated in FIG. 15 was also manufactured. In FIG. 15, the middle land portions (a) are provided with lateral grooves (b) and sipes (c) which traverse the middle land portions completely. Further, the middle land portions (a) are not provided with any circumferentially extending sipes. The tread pattern as illustrated in FIG. 15 had the same as the tread pattern illustrated in FIG. 9 except the middle land portions (a). The common specification and the testing methods of the test tires are as follows.

Test vehicle: four-wheel drive vehicle with 3600 cc with displacement
Tire location(s): all wheels
Rim size: 18×7.5 J
Tire inner pressure: 240 kPa
Snow Road Performance Test:

A test driver drove the above-mentioned vehicle on a snowy road, and then evaluated driving performance by the driver's sense. The test results are shown in Table 3 by a score system in which the comparative example (Ref 2) is assumed to be 100. The larger numeric value indicates better the performance.
Steering Stability Test:

A test driver drove the above-mentioned vehicle on a dry asphalt road, and then evaluated steering stability by the driver's sense. The test results are shown in Table 3 by a

TABLE 2

|  | Ref. | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|---|
| Tread pattern | FIG. 14 | FIG. 9 | FIG. 9 | FIG. 9 | FIG. 9 | FIG. 9 | FIG. 9 | FIG. 9 | FIG. 9 | FIG. 9 |
| Lateral groove lengths L1/middle land portion maximum width Lm | 0.7 | 0.7 | 0.6 | 0.65 | 0.75 | 0.8 | 0.7 | 0.7 | 0.7 | 0.7 |
| Outboard middle land portion width/inboard middle land portion width | 1.09 | 1.09 | 1.09 | 1.09 | 1.09 | 1.09 | 1 | 1.05 | 1.12 | 1.15 |
| Snow road performance (score) | 100 | 104 | 102 | 103 | 104 | 105 | 105 | 104 | 104 | 103 |
| Steering stability (score) | 100 | 106 | 107 | 106 | 105 | 103 | 103 | 105 | 106 | 106 | score system in which the comparative example (Ref 2) is assumed to be 100. The larger numeric value indicates better the performance.

Table 3 shows the test results.

TABLE 3

|  | Ref. 2 | Ex. 19 | Ex. 20 | Ex. 21 | Ex. 22 | Ex. 23 | Ex. 24 | Ex. 25 | Ex. 26 | Ex. 27 |
| --- | --- | --- | --- | --- | --- | --- | --- | --- | --- | --- |
| Tread pattern | FIG. 15 | FIG. 9 | FIG. 9 | FIG. 9 | FIG. 9 | FIG. 9 | FIG. 9 | FIG. 9 | FIG. 9 | FIG. 9 |
| First chamfered portion lengths/ lateral groove pitch | 0.4 | 0.4 | 0.3 | 0.35 | 0.45 | 0.5 | 0.7 | 0.7 | 0.7 | 0.7 |
| First chamfered portion depths/ main groove depths | 0.75 | 0.75 | 0.75 | 0.75 | 0.75 | 0.75 | 0.65 | 0.7 | 0.8 | 0.85 |
| Snow road performance (score) | 100 | 103 | 102 | 103 | 104 | 104 | 102 | 103 | 103 | 104 |
| Steering stability (score) | 100 | 107 | 107 | 107 | 106 | 105 | 108 | 107 | 106 | 105 |

From the test results, it is confirmed that the example tires according to the disclosure improve steering stability on asphalt road and snow performance in a well-balanced manner.

What is claimed is:

1. A tire comprising:
a tread portion comprising at least one land portion having axially spaced first and second ends;
the at least one land portion being provided with
lateral grooves extending from the first end to terminal ends terminating within the at least one land portion,
first sipes each extending along a tire circumferential direction to connect a pair of lateral grooves arranged adjacently in the tire circumferential direction,
second sipes extending from the first end toward the first sipes, and
third sipes extending from the second end toward the first sipes; and
the second sipes and the third sipes being arranged without intersecting the lateral grooves,
wherein the at least one land portion comprises a ground contact surface between the first end and the second end, and a pair of land sidewalls,
the at least one land portion comprises the second sipes communicated with the first sipes, the third sipes communicated with the first sipes, and at least one chamfered portion provided on a corner between the ground contact surface and one of the pair of land sidewalls,
the second sipes and the third sipes are communicated with the first sipes at same locations in the tire circumferential direction,
the at least one chamfered portion comprises at least one first chamfered portion provided on the first end side so as to connect one lateral groove and one second sipe which are adjacently arranged, and
wherein an angle, in a plan view of the tread portion, between the one lateral groove and the at least one first chamfered portion is an obtuse angle.

2. The tire according to claim 1,
wherein the second sipes, the third sipes and the lateral grooves are inclined in a same direction as each other with respect to a tire axial direction.

3. The tire according to claim 1,
wherein the second sipes and the third sipes are substantially in communication with the first sipes.

4. The tire according to claim 1,
wherein at least one end of each of the first sipes is in communication with one of the lateral grooves.

5. The tire according to claim 1,
wherein two or more second sipes are arranged between a pair of lateral grooves arranged adjacently in the tire circumferential direction.

6. The tire according to claim 1,
wherein two or more third sipes are provided between a pair of lateral grooves arranged adjacently in the tire circumferential direction.

7. The tire according to claim 1,
the at least one land portion being further provided with fourth sipes extending from the terminal ends of the lateral grooves to the second end.

8. The tire according to claim 1,
wherein the at least one land portion comprises two middle land portions between which a tire equator is disposed,
the respective middle land portions comprise the second sipes communicated with the first sipes and the third sipes communicated with the first sipes, and
the second sipes and the third sipes are communicated with the first sipes at same locations in the tire circumferential direction.

9. The tire according to claim 1,
wherein the tread portion has a predetermined orientation for mounting on a vehicle to define an outboard tread edge to be located outwardly of the vehicle and an inboard tread edge to be located inwardly of the vehicle upon being mounted on the vehicle, and
the first end corresponds to an axial end on the inboard tread edge side of respective middle land portions.

10. The tire according to claim 9,
wherein the middle land portions comprise an inboard middle land portion disposed between the inboard tread edge and the tire equator, and an outboard middle land portion disposed between the outboard tread edge and the tire equator, and
an axial width of the outboard middle land portion is greater than an axial width of the inboard middle land portion.

11. The tire according to claim 10,
wherein the axial width of the outboard middle land portion is in a range of from 1.05 to 1.10 times the axial width of the inboard middle land portion.

12. The tire according to claim 10,
wherein each of the outboard middle land portion and the inboard middle land portion includes lateral grooves; and
axial lengths of the lateral grooves provided on the outboard middle land portion are greater than axial lengths of the lateral grooves provided on the inboard middle land portion.

13. The tire according to claim 10,
wherein a ratio of axial lengths of the lateral grooves provided on the outboard middle land portion to the axial width of the outboard middle land portion is in a range of from 0.95 to 1.05 times a ratio of axial lengths of the lateral grooves provided on the inboard middle land portion to the axial width of the inboard middle land portion.

14. The tire according to claim 9,
the tread portion being further provided with a circumferentially extending outboard shoulder main groove arranged between the tire equator and the outboard tread edge to define an outboard shoulder land portion disposed between the outboard shoulder main groove and the outboard tread edge,
the outboard shoulder land portion being provided with at least one outboard shoulder sipe extending from the outboard tread edge to the outboard shoulder main groove, and
the at least one outboard shoulder sipe comprising a middle shallow-bottom portion where a sipe bottom raises locally between the outboard shoulder main groove and the outboard tread edge.

15. A tire comprising:
a tread portion comprising at least one land portion having axially spaced first and second ends;
the at least one land portion being provided with
lateral grooves extending from the first end to terminal ends terminating within the at least one land portion,
first sipes each extending along a tire circumferential direction to connect a pair of lateral grooves arranged adjacently in the tire circumferential direction,
second sipes extending from the first end toward the first sipes, and
third sipes extending from the second end toward the first sipes; and
the second sipes and the third sipes being arranged without intersecting the lateral grooves,
wherein the at least one land portion comprises a ground contact surface between the first end and the second end, and a pair of land sidewalls,
the at least one land portion comprises the second sipes communicated with the first sipes, the third sipes communicated with the first sipes, and at least one chamfered portion provided on a corner between the ground contact surface and one of the pair of land sidewalls,
the second sipes and the third sipes are communicated with the first sipes at same locations in the tire circumferential direction,
the at least one chamfered portion comprises at least one first chamfered portion provided on the first end side so as to connect one lateral groove and one second sipe which are adjacently arranged, and
wherein the at least one first chamfered portion has a depth greater than a depth of the first sipe.

16. A tire comprising:
a tread portion comprising at least one land portion having axially spaced first and second ends;
the at least one land portion being provided with
lateral grooves extending from the first end to terminal ends terminating within the at least one land portion,
first sipes each extending along a tire circumferential direction to connect a pair of lateral grooves arranged adjacently in the tire circumferential direction,
second sipes extending from the first end toward the first sipes, and
third sipes extending from the second end toward the first sipes; and
the second sipes and the third sipes being arranged without intersecting the lateral grooves,
wherein the at least one land portion comprises a ground contact surface between the first end and the second end, and a pair of land sidewalls,
the at least one land portion comprises the second sipes communicated with the first sipes, the third sipes communicated with the first sipes, and at least one chamfered portion provided on a corner between the ground contact surface and one of the pair of land sidewalls,
the second sipes and the third sipes are communicated with the first sipes at same locations in the tire circumferential direction,
the at least one chamfered portion comprises at least one first chamfered portion provided on the first end side so as to connect one lateral groove and one second sipe which are adjacently arranged, and
wherein the at least one first chamfered portion has a depth greater than a depth of the one lateral groove to which the at least one first chamfered portion is connected.

17. A tire comprising:
a tread portion comprising at least one land portion having axially spaced first and second ends;
the at least one land portion being provided with
lateral grooves extending from the first end to terminal ends terminating within the at least one land portion,
first sipes each extending along a tire circumferential direction to connect a pair of lateral grooves arranged adjacently in the tire circumferential direction,
second sipes extending from the first end toward the first sipes, and
third sipes extending from the second end toward the first sipes; and
the second sipes and the third sipes being arranged without intersecting the lateral grooves,
wherein the at least one land portion comprises a ground contact surface between the first end and the second end, and a pair of land sidewalls,
the at least one land portion comprises the second sipes communicated with the first sipes, the third sipes communicated with the first sipes, and at least one chamfered portion provided on a corner between the ground contact surface and one of the pair of land sidewalls,
the second sipes and the third sipes are communicated with the first sipes at same locations in the tire circumferential direction,
the at least one chamfered portion comprises at least one first chamfered portion provided on the first end side so as to connect one lateral groove and one second sipe which are adjacently arranged, and
wherein at least two third sipes are provided between a pair of lateral grooves arranged adjacently in the tire circumferential direction, and
the at least one chamfered portion comprises at least one second chamfered portion provided on the second end side so as to connect two third sipes which are adjacent arranged.

18. The tire according to claim 17,
wherein a region in which the at least one second chamfered portion is axially projected on the first end overlaps the at least one first chamfered portion at least partially.

* * * * *